US007266102B2

(12) United States Patent
Takano et al.

(10) Patent No.: US 7,266,102 B2
(45) Date of Patent: Sep. 4, 2007

(54) MOBILE COMMUNICATION SYSTEM, BASE STATION, METHOD OF CONTROLLING PACKET TRANSMISSION TIMING USED FOR THE SAME MOBILE COMMUNICATION SYSTEM AND BASE STATION, AND RECORDING MEDIUM RECORDING PROGRAM THEREOF

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 1038 days.

(21) Appl. No.: 10/160,093

(22) Filed: Jun. 4, 2002

(65) Prior Publication Data

US 2002/0187786 A1 Dec. 12, 2002

(30) Foreign Application Priority Data

Jun. 8, 2001 (JP) ............................. 2001-173345

(51) Int. Cl.
*H04Q 7/00* (2006.01)
(52) U.S. Cl. ...................................... 370/332; 370/318
(58) Field of Classification Search ............... 370/349, 370/331–333
See application file for complete search history.

(56) References Cited

U.S. PATENT DOCUMENTS

| 6,069,883 | A | 5/2000 | Ejzak et al. | |
|---|---|---|---|---|
| 6,088,335 | A | 7/2000 | I et al. | |
| 2001/0036830 | A1* | 11/2001 | Wu et al. | 455/436 |
| 2002/0094833 | A1* | 7/2002 | Lieshout et al. | 455/522 |
| 2004/0246917 | A1* | 12/2004 | Cheng et al. | 370/328 |

FOREIGN PATENT DOCUMENTS

| EP | 0 989 691 A2 | 3/2000 |
|---|---|---|
| EP | 1 059 736 A2 | 12/2000 |
| JP | H11-69416 A | 3/1999 |
| JP | H11-234740 A | 8/1999 |
| JP | H11-308657 A | 11/1999 |
| JP | 2000-165927 A | 6/2000 |
| JP | 2001-45546 A | 2/2001 |
| JP | 2001-103529 A | 4/2001 |

OTHER PUBLICATIONS

Laurence Mailaender et al., "Simple Inter-Cell Coordination Schemes for a High Speed CDMA Packet Downlink", IEEE 51st Vehicular Technology Conference Proceedings, Tokyo, Japan, 2000, pp. 1845-1848.

* cited by examiner

*Primary Examiner*—Brian Nguyen
(74) *Attorney, Agent, or Firm*—Sughrue Mion, PLLC

(57) ABSTRACT

To provide a mobile communication system in which high-speed transmission to a mobile station located in the vicinity of a cell boundary can be performed without causing any deterioration in a mobile station line quality. A HS-PDSCH data transmission timing detection portion of a base station executes a program stored on a recording medium to check a HS-PDSCH data transmission timing notice from the mobile station, to receive the transmission timing notice, and to send this notice to a control portion. The control portion controls a power for transmission of HS-PDSCH data from a modulation and encoding portion in response to the transmission timing notice from the HS-PDSCH data transmission timing detection portion. Also, when the base station transmits HS-PDSCH data to the mobile station, the control portion operates so as to make a HS-PDSCH data transmission timing notification portion send out HS-PDSCH data transmission timing information to the mobile station.

66 Claims, 29 Drawing Sheets

FIG. 19

|  | IDENTIFICATION CODE |
|---|---|
| B S #1 | 0 1 0 1 0 1 |
| B S #2 | 0 1 0 1 1 0 |
| B S #3 | 0 1 0 1 1 1 |
| B S #1 & B S #2 | 1 0 1 1 0 1 |
| B S #2 & B S #3 | 1 1 1 1 0 1 |

MOBILE COMMUNICATION SYSTEM, BASE STATION, METHOD OF CONTROLLING PACKET TRANSMISSION TIMING USED FOR THE SAME MOBILE COMMUNICATION SYSTEM AND BASE STATION, AND RECORDING MEDIUM RECORDING PROGRAM THEREOF

BACKGROUND OF THE INVENTION

1. Field of the Invention

The present invention relates to a mobile communication system, a base station, a method of controlling packet transmission timing used for the mobile communication system and the base station, and a recording medium on which a program is recorded. More particularly, the present invention relates to a method of controlling timing of transmission of data by high speed downlink packet access (HSDPA) method.

2. Description of the Prior Art

In recent years, the development of multimedia-ready mobile terminals (mobile stations) such as a cellular phone has been advanced to enable handling of still images of a large data amount and short-time moving images. A need has arisen for a high-capacity high-speed data transmission method for use of such mobile devices.

As such a high-capacity high-speed data transmission method, HSDPA methods using a physical downlink shared channel (PDSCH) or a high-speed-physical downlink shared channel (HS-PDSCH) such that only the transmission speed in the downstream direction (the direction from a base station to a mobile station) is increased, and other methods have been proposed.

In a mobile communication system in which data is transmitted from a base station to a mobile station by using the above-mentioned HS-PDSCH, the quality of reception (Ec/Io (energy per chip/interfering wave power per unit frequency)) of a common pilot signal (common pilot channel (CPICH)) transmitted from each of base stations during soft handover is measured in a mobile station, and a base station controller is notified of the measurement result from the mobile station through the base station.

The base station controller identifies, on the basis of the measurement result from the mobile station, the base station with which the highest quality of reception of the common pilot signal data is achieved, and transfers to this base station data to be transmitted by HSDPA method. The base station divides the data transferred from the base station controller into blocks and transmits the divided data blocks one after another at an optimum data transmission rate according to the channel quality of the downstream line. The optimum data transmission rate is a highest possible transmission rate at which data can be transmitted while the desired error rate is ensured. Data can be transmitted at a higher rate if the channel quality is higher or the reception signal interference ratio (SIR) (signal power/(interference power+noise)) is higher in the mobile station. Since in ordinary cases the transmission power in the base station is constant for the HSDPA method, the transmission speed in the HSDPA method is inversely proportional to the interference power if noise is constant.

In the above-described conventional mobile communication system, transmission timing for transmission of data by HSDPA method is independently performed in each base station and data is transmitted from only one base station even to a mobile station located in the vicinity of a cell boundary. While data is being transmitted to this mobile station by HSDPA method, another base station having its cell boundary in the vicinity of this mobile station may transmit data to another mobile station by HSDPA method. In such a situation, interference at the mobile station in the vicinity of the cell boundary increases to reduce the reception quality. A deterioration is thereby caused in the channel quality of the mobile station in the vicinity of the cell boundary to make it difficult to perform high-speed transmission to the mobile station.

Moreover, since the mobile station notifies the base station controller of the result of measurement of the common pilot signal reception quality through the base station, and since data to be transmitted by HSDPA method is transferred from the base station controller to the base station with which the highest quality of reception of the common pilot signal is achieved, a control delay occurs before a start of data transmission by HSDPA method. Because the state of the propagation path changes even during the period of this delay, it cannot be ensured that the line for data transmission by HSDPA method provided by the base station selected by the base station controller is always highest in quality.

BRIEF SUMMARY OF THE INVENTION

In view of the above-described problems, an object of the present invention is to provide a mobile communication system in which deterioration in the quality of a line to a mobile station located in the vicinity of a cell boundary is limited to ensure high-speed data transmission to the mobile station, a base station capable of such high-speed transmission, a method of controlling packet transmission timing used for the mobile communication system and the base station, and a recording medium on which a program is recorded.

To attain the above-described object, according to one aspect of the present invention, there is provided a mobile communication system in which individual-communication signals are transmitted and received between at least first and second base stations and a mobile station located in the vicinity of a cell boundary between the first and second base stations to achieve soft handover, and in which data transmission from each of the first and second base stations to the mobile station is performed by high-speed downlink packet access (HSDPA) method, the system having control means for controlling HSDPA method data transmission performed in one of the first and second base stations when HSDPA method data transmission is performed in the other of the first and second base stations.

According to another aspect of the present invention, there is provided a base station which exchanges individual-communication signals with a first mobile station located in the vicinity of a cell boundary to achieve soft handover, and which transmits data to the mobile station by high speed downlink packet access (HSDPA) method, the base station having control means for controlling HSDPA method data transmission in itself when HSDPA method data transmission is performed in another base station.

According to still another aspect of the present invention, there is provided a method of controlling timing of packet transmission in a mobile communication system in which individual-communication signals are transmitted and received between at least first and second base stations and a first mobile station located in the vicinity of a cell boundary between the first and second base stations to achieve soft handover, and in which data transmission from each of the first and second base stations to the first mobile station is performed by high-speed downlink packet access (HSDPA) method, the method including a step of controlling HSDPA method data transmission in one of the first and second base stations when HSDPA method data transmission is performed in the other of the first and second base stations.

According to a further aspect of the present invention, there is provided a recording medium on which is recorded a program for carrying out a method of controlling timing of packet transmission in a mobile communication system in which individual-communication signals are transmitted and received between at least first and second base stations and a first mobile station located in the vicinity of a cell boundary between the first and second base stations to achieve soft handover, and in which data transmission from each of the first and second base stations to the first mobile station is performed by high-speed downlink packet access (HSDPA) method. The program enables a computer to execute processing for controlling HSDPA method data transmission in one of the first and second base stations when HSDPA method data transmission is performed in the other of the first and second base stations.

In the mobile communication system in accordance with the present invention, in a situation where a mobile station exists in the vicinity of a cell boundary between adjacent base stations, and where data transmission from one of the base stations to the mobile station is performed by HSDPA method, the timing of HSAPA data transmission from another of the base stations to another mobile station is controlled so as not to reduce the rate of packet transmission from the base station to the mobile station. In this manner, the rate of transmission to the mobile station at the cell boundary between the adjacent base stations is increased to improve the throughput of the entire system.

More specifically, in a situation where, in the mobile communication system of the present invention, a first mobile station located in the vicinity of a cell boundary between first and second base stations is exchanging individual-communication signals (dedicated physical channel (DPCH) with the first and second base stations, and where data transmission from the first base station to the mobile station is performed by HSDPA method, the first base station notifies the first mobile station of timing of data transmission by HSDPA method, the mobile station then notifies the second base station of this transmission timing by using the upstream-line individual-communication signal, and the second base station controls the timing of HSDPA method data transmission in itself on the basis of the transmission timing notified from the mobile station.

In controlling the timing of HSDPA method data transmission in itself, the second base station sets the timing of HSDPA method data transmission to a second mobile station different from the timing of transmission from the first base station notified from the first mobile station.

Also, in controlling the timing of HSDPA method data transmission in itself, the second base station receives the upstream-line individual-communication signal from the first mobile station, and, upon receiving this signal, the second base station controls or turns off the power for HSDPA method data transmission to the second mobile station if a packet reception acknowledgment signal is contained in the signal. (This transmission power control comprises reducing the transmission power as well as turning off the power.)

Further, in controlling the timing of HSDPA method data transmission in itself, upon receiving the upstream-line individual-communication signal from the first mobile station, the second base station controls the timing of HSDPA method data transmission to the second mobile station on the basis of information about the quality of reception of a common pilot signal, which information is contained in the individual-communication signal.

In this case, the information about the quality of reception of the common pilot signal added to the upstream-line individual-communication signal is, for example, information indicating the results of measurement of the quality of reception of the common pilot signal from the first and second base stations, or information (e.g., base station identification information set in advance) designating the base station which may cause large interference, and which is identified from the quality of reception of the common pilot signal from the first and second base stations.

Also, when the second base station determines, from the information about the pilot signal reception qualities contained in the upstream-line individual communication signal from the first mobile station, that interference from itself with the first mobile station is large, it controls or turns off the power for HSDPA method data transmission to the second mobile station.

As described above, the timing of HSDPA method data transmission from the second base station to the second mobile station is controlled to enable high-speed transmission to the first mobile station without causing deterioration in the mobile station line quality in the vicinity of the cell boundary.

That is, in the case where the mobile station is located at the cell boundary, the propagation loss of the path from the base station communicating with the mobile station is larger and the difference between this propagation loss and the propagation loss of the path to the adjacent base station is smaller, so the mobile station can receive large interference. For example, when the first mobile station is located in the vicinity of the cell boundary between the first and second base stations, the first base station may transmits packets to the first mobile station while the second base station is transmitting packets to the second mobile station. In such a case, the signal transmitted from the second base station causes strong interference with the first mobile station. The rate of transmission of packets from the first base station to the first mobile station is thereby reduced to half or less.

According to the present invention, when the first mobile station is located in the vicinity of the cell boundary between the first and second base stations, the timing of packet transmission to the second mobile station is controlled by the adjacent second base station so as not to largely reduce the rate of transmission of packets from the first base station to the first mobile station. In this manner, the rate of transmission of packets to the first mobile station is increased to improve the throughput of the entire system.

BRIEF DESCRIPTION OF THE DRAWINGS

FIG. 19 is a diagram showing an example of identification codes determined by the base station controller shown in FIG. 18;

DETAILED DESCRIPTION OF THE PREFERRED EMBODIMENTS

Figure 1:
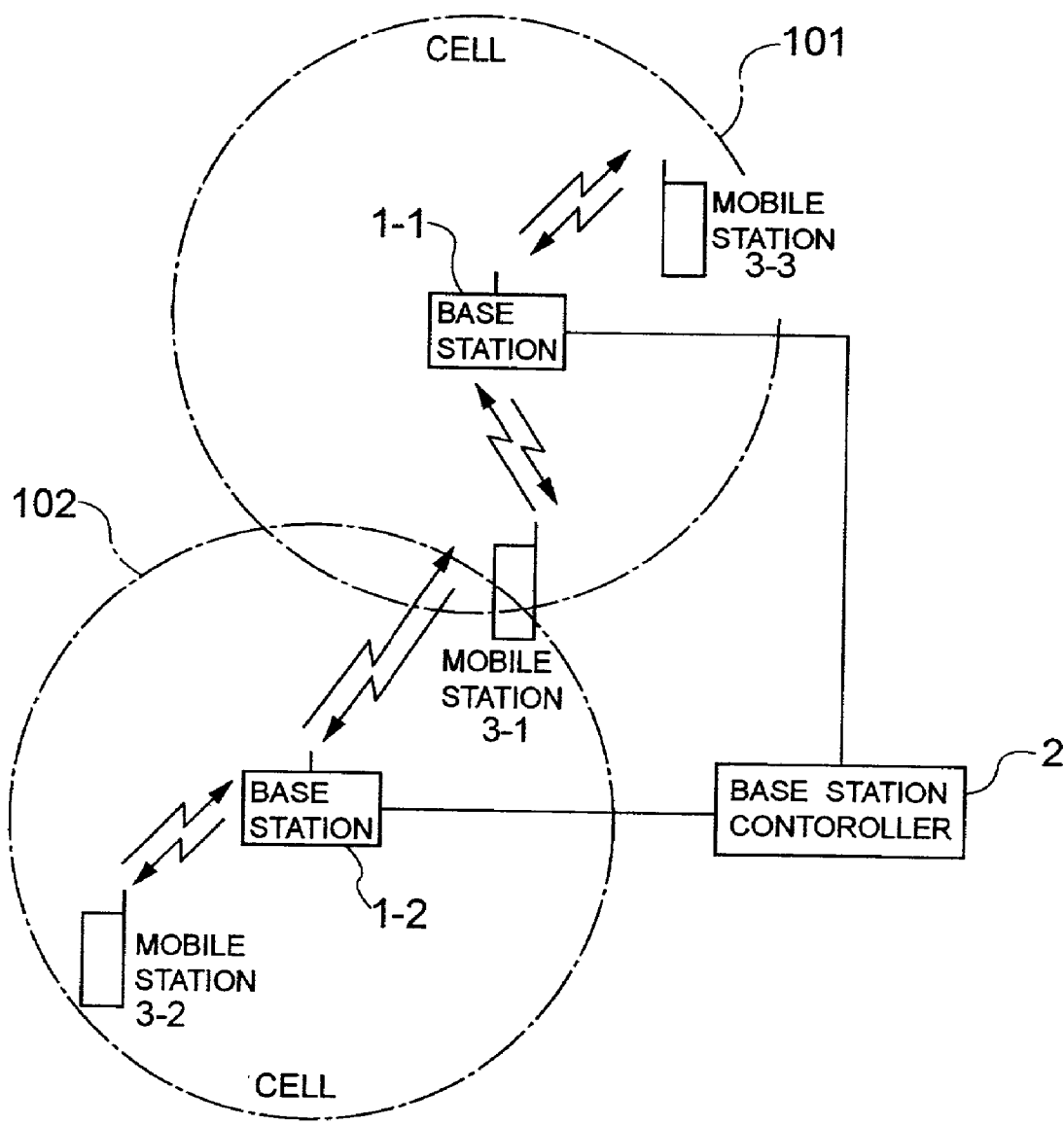
FIG. 1 is a block diagram showing a configuration of a mobile communication system in a mode of implementation of the present invention.

Next, embodiments of the present invention will be described with reference to the accompanying drawings. FIG. 1 is a block diagram showing a configuration of a mobile communication system embodying an embodiment of the present invention. Referring to FIG. 1, the mobile communication system embodying the present invention is constituted by base stations 1-1 and 1-2, a base station controller (e.g., radio network controller (RNC)) 2, and mobile stations 3-1 to 3-4. Data transmission from each of the base stations 1-1 and 1-2 to the mobile stations 3-1 to 3-4 is performed by the high speed downlink packet access (HSDPA) method.

In the mobile communication system embodying the embodiment of the present invention, a plurality of base stations 1-1 and 1-2 are provided in a service area and a plurality of mobile stations 3-1 to 3-4 exist in cells 101 and 102 of the base stations 1-1 and 1-2. The base stations 1-1 and 1-2 are connected to the common base station controller 2. The base station controller 2 is connected to a communication network (not shown).

Each of the base stations 1-1 and 1-2 transmits a common pilot signal (common pilot channel (CPICH)) to the mobile stations 3-1 to 3-4. The common pilot signal is spread with each of scrambling codes set in correspondence with the cells 101 and 102. Each of the mobile stations 3-1 to 3-4 discriminates the cells 101 and 102 (i.e., the base stations 1-1 and 1-2) from each other on the basis of the difference between the scrambling codes.

When the mobile station 3-1 receives downstream data, it sets with one base station or a plurality of base stations 1-1 and 1-2 an individual-communication signal (dedicated physical channel (DPCH)) (upstream and downstream lines) and enters a data reception standby state. In this case, the mobile station 3-1 measures the quality of reception (Ec/Io (energy per chip/interfering wave power per unit frequency)) of the common pilot signal from the base stations 1-1 and 1-2 and sets an individual-communication signal between itself and the base station 1-1 with which the highest quality of reception of the common pilot signal is achieved.

If the difference in common pilot signal reception quality between the base stations 1-1 and 1-2 is equal to or smaller than a predetermined value set in advance, the mobile station 3-1 enters a state where it also sets an individual-communication signal between itself and the base station 1-2 and sets the signal between itself and a plurality of base stations 1-1 and 1-2, i.e., a soft handover state.

Each of the base stations 1-1 and 1-2 transmits data over a high-speed-physical downlink shared channel (HS-PD-SCH) to the mobile stations 3-1 to 3-4 by dividing the data into blocks. HS-PDSCH is a higher speed in comparison with a individual-communication signal, and HS-PDSCH data is transmitted by transmission power higher than the individual-communication signal for a downstream signal.

Each of the base stations 1-1 and 1-2 uses one HS-PDSCH for transmission of data to the plurality of mobile stations 3-1 to 3-4. When each of the base stations 1-1 and 1-2 performs data transmission to the plurality of mobile stations 3-1 to 3-4, it determines timing of data transmission to each mobile station and transmits data to the mobile stations 3-1 to 3-4 by different timings determined in correspondence with the mobile stations 3-1 to 3-4.

In this transmission, the base station 1-1 transmits HS-PDSCH data to the mobile station 3-1 by dividing the data into blocks. A cyclic redundancy check (CRC) code (error detection code) is added to each block. When the mobile station 3-1 receives HS-PDSCH data blocks, it determines whether there is an error in each received data block using CRC code and notifies the base station 1-1 of the determination result.

When data to be transmitted to the mobile station 3-1 arrives at the base station controller 2 from a communication network, the base station controller 2 sends the data to the base station 1-1 with which the highest reception quality is achieved among the base stations 1-1 and 1-2 with which the mobile station 3-1 has set individual-communication signals. When the data to be transmitted to the mobile station 3-1 arrives at the base station 1-1 from the base station controller 2, the base station 1-1 gives the mobile station 3-1 advance notice of data transmission (notice of transmission timing) by using the individual-communication signal.

When given the advance notice of data transmission from the base station 1-1, the mobile station 3-1 notifies, by means of the individual-communication signal over the upstream line, the base station 1-2 operating for soft handover of the timing of transmission of data from the base station 1-1. The base station 1-2 avoids transmission of HS-PDSCH data blocks to other mobile stations (e.g., mobile stations 3-2 and 3-4) at the time determined by the notified transmission timing.

The power for transmission of HS-PDSCH data is constant. The rate of this data transmission is adaptively controlled with respect to the propagation loss and interference power over the downstream line. If each of the transmission power and the propagation loss is constant, the transmission rate is in inverse proportion to the interference power. Even if the mobile station 3-1 is located in the vicinity of the cell boundary and if the difference in propagation loss from the adjacent cell is small, HS-PDSCH data is transmitted only from the base station 1-1.

In the above-described example of the transmission process, advance notice of data transmission is given from the base station 1-1. However, the arrangement may alternatively be such that if packets are sent, the mobile station 3-1 transmits a signal indicating that packets will be sent to it to the base stations 1-1 and 1-2 before a predetermined time T at which the packets are sent, and the base stations 1-1 and 1-2 can be notified through this signal of packet transmission to the mobile station 3-1 after the predetermined time T at which the signal is sent. In such a case, the base station 1-2 can know the timing of packet transmission from the base station 1-1 to the mobile station 3-1 from the signal sent from the mobile station 3-1 and indicating that packets will be sent to it and, therefore, there is no need for advance data transmission notice from the mobile station 3-1 to the base station 1-2. The same can also be said in the following description.

In the above-described example of the transmission process, the base station 1-2 avoids transmission of HS-PDSCH data blocks to other mobile stations at the time determined by the notified transmission timing. However, since reducing interference with data transmission from the base station 1-1 to the mobile station 3-1 suffices, a method of reducing the power for transmission of HS-PDSCH data blocks to from the base station 1-2 to the other mobile stations may alternatively be used. Thus, transmission power control is performed by stopping data transmission or reducing the transmission power.

Figure 2:
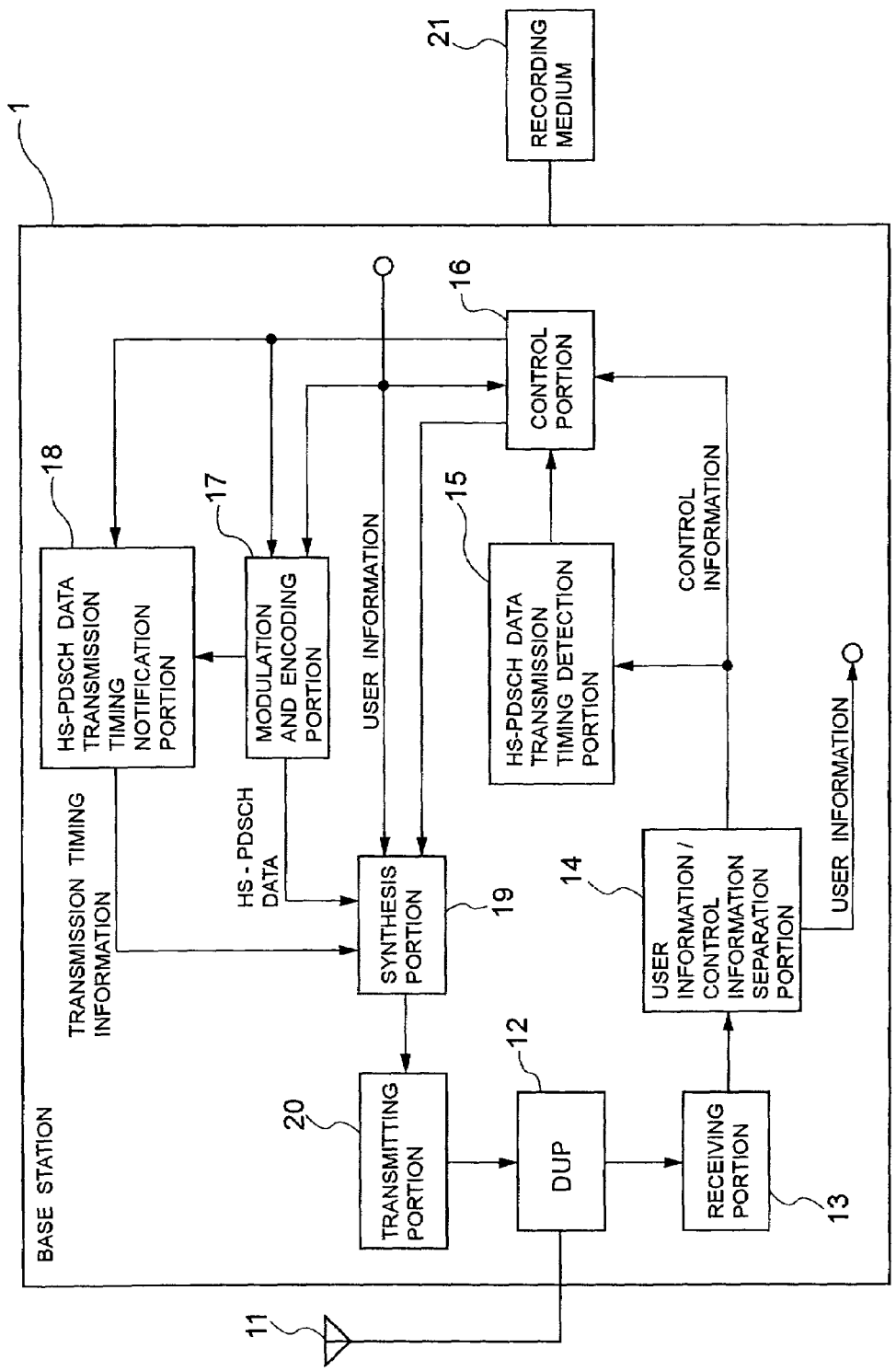
FIG. 2 is a block diagram showing a configuration of a base station in a first embodiment of the present invention.

FIG. 2 is a block diagram showing a configuration of a base station in a first embodiment of the present invention. Referring to FIG. 2, a base station 1 is constituted by an antenna 11, a transmitting and receiving shared device (duplexer (DUP)) 12, a receiving portion 13, a user information/control information separation portion 14, a HS-PDSCH data transmission timing detection portion (hereinafter referred to as "transmission timing detection portion") 15, a control portion 16, a modulation and encoding portion 17, a HS-PDSCH data transmission timing notification portion (hereinafter referred to as "transmission timing notification portion") 18, a synthesis portion 19, a transmitting portion 20, and a recording medium 21. The base station 1 also includes a call control portion, a speech input/output portion, and a display portion, which will not be described with respect to their configuration and operation since well-known techniques can be applied to them.

The receiving portion 13 receives a signal (DPCH (UL), etc.) through the antenna 11 and the transmitting and receiving shared device 12, and supplies the received signal to the user information/control information separation portion 14. The user information/control information separation portion 14 separates the received signal from the receiving portion 13 into user information (e.g., speech signal and image signal) and control information, supplies the user information to the above-mentioned call control portion, speech output portion and display portion of the base station 1, and supplies the control information to the transmission timing detection portion 15 and to the control portion 16.

The transmission timing detection portion 15 executes a program stored on the recording medium 21 to check notice of timing of HS-PDSCH data transmission from mobile stations (not shown) and to send a transmission timing notice to the control portion 16 when receiving the transmission timing notice.

The control portion 16 executes a program stored on the recording medium 21 to control the portions of the base station 1 by forming various control signals on the basis of the control information from the user information/control information separation portion 14 and input information externally supplied (e.g., control information or the like from an unillustrated base station controller) and by outputting the control signals to the portions of the base station 1. Programs to be executed by the portions of the base station 1 including the control portion 16 are stored on the recording medium 21.

Also, the control portion 16 controls the power for transmission of HS-PDSCH data from the modulation and encoding portion 17 in response to a transmission timing notice from the transmission timing detection portion 15. Further, when HS-PDSCH data is transmitted to a mobile station from the station to which it belongs, the control portion 16 controls the transmission timing notification portion 18 so that the transmission timing notification portion 18 transmits information on HS-PDSCH data transmission timing to the mobile station.

The modulation and encoding portion 17 performs modulation and encoding of user information under the control of the control portion 16, and supplies the processed information as HS-PDSCH data to the synthesis portion 19. When HS-PDSCH data is transmitted from the modulation and encoding portion 17, the transmission timing notification portion 18 supplies information on the timing of transmission of the data to the synthesis portion 19 under the control of the control portion 16.

The synthesis portion 19 combines control information from the control portion 16, HS-PDSCH data from the modulation and encoding portion 17, transmission timing information from the transmission timing notification portion 18, and/or a input signal from any other portions, e.g., the call control portion and the speech input portion of the base station 1. The information combined by the synthesis portion 19 is sent out as a DPCH (DL) or HS-PDSCH signal from the antenna 11 through the transmitting portion 20 and the transmitting and receiving shared device 12.

Each of the base stations 1-1 and 1-2 shown in FIG. 1 has the same configuration (not shown) as the above-described configuration of the base station 1 shown in FIG. 2 and operates in the same manner as the base station 1.

Figure 3:
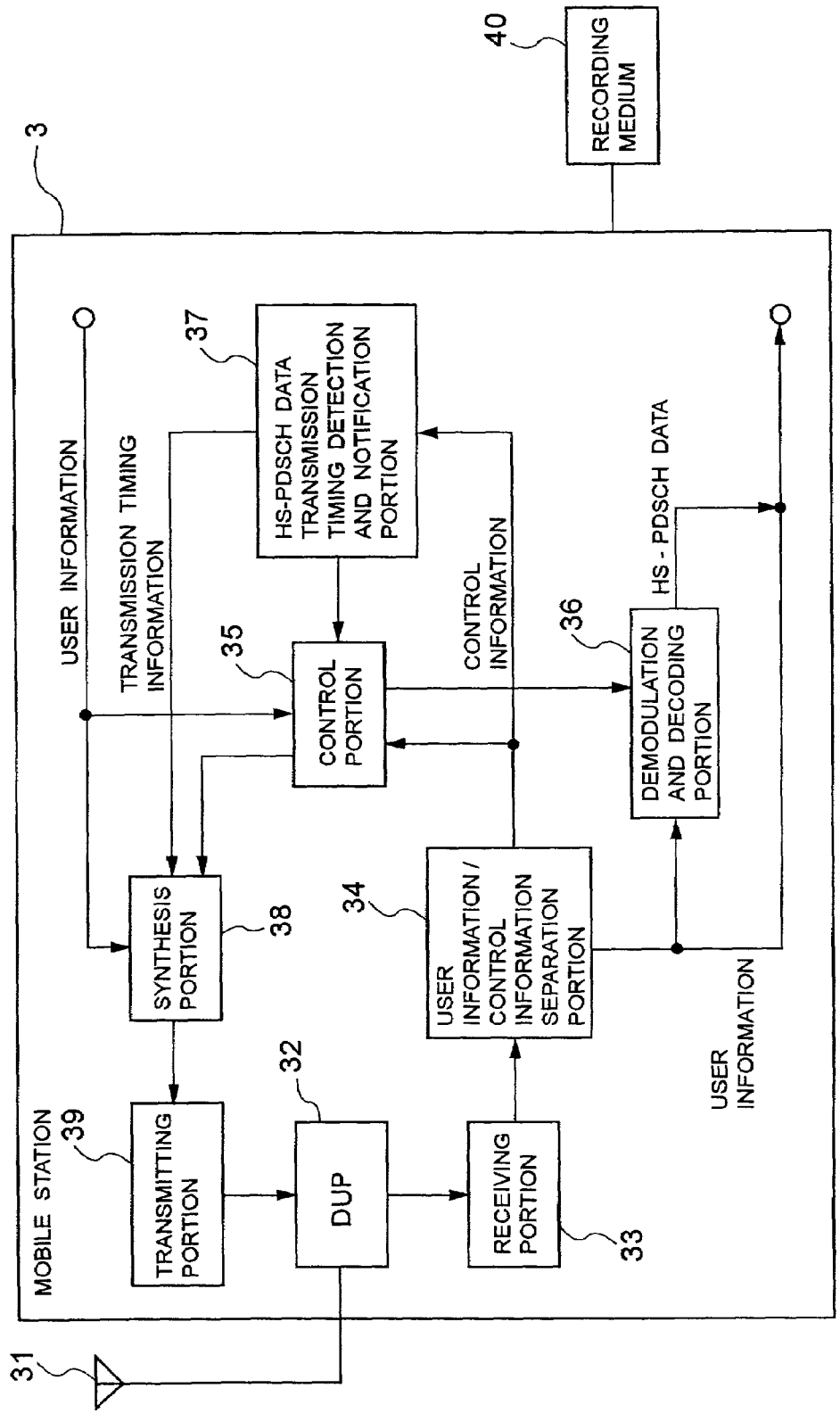
FIG. 3 is a block diagram showing a configuration of a mobile station in the first embodiment of the present invention.

FIG. 3 is a block diagram showing a configuration of a mobile station in the first embodiment of the present invention. Referring to FIG. 3, a mobile station 3 is constituted by an antenna 31, a transmitting and receiving shared device (duplexer (DUP)) 32, a receiving portion 33, a user information/control information separation portion 34, a control portion 35, a demodulation and decoding portion 36, a HS-PDSCH data transmission timing detection and notification portion (hereinafter referred to as "transmission timing detection and notification portion") 37, a synthesis portion 38, a transmitting portion 39, and a recording medium 40. The mobile station 3 also includes a call control portion, a speech input/output portion, and a display portion, which will not be described with respect to their configuration and operation since well-known techniques can be applied to them.

The receiving portion 33 receives a signal (common pilot signal, individual-communication signal, HS-PDSCH) through the antenna 31 and the transmitting and receiving shared device 32, and supplies the received signal to the user information/control information separation portion 34. The user information/control information separation portion 34 separates the received signal from the receiving portion 33 into user information (e.g., speech signal and image signal) and control information, supplies the user information to the demodulation and decoding portion 36 and to the above-mentioned call control portion, speech output portion and display portion of the mobile station 3, and supplies the control information to the control portion 35 and to the transmission timing detection and notification portion 37.

The control portion 35 executes a program stored on the recording medium 40 to control the portions of the mobile station 3 by forming various control signals on the basis of the control information from the user information/control information separation portion 34 and input information externally supplied (e.g., user information or the like from a ten key unit or the speech input portion) and by outputting the control signals to the portions of the mobile station 3, to form control information to be sent to the base station 1, and to supply this control information to the synthesis portion 38. Programs to be executed by the portions of the mobile station 3 including the control portion 35 are stored on the recording medium 40.

The demodulation and decoding portion 36 performs demodulation and decoding of user information separated by the user information/control information separation portion 34, and outputs HS-PDSCH data to the relating portion of the mobile station 3. The transmission timing detection and notification portion 37 checks whether the control information separated by the user information/control information separation portion 34 contains information on timing of transmission of HS-PDSCH data. When the transmission timing detection and notification portion 37 detects HS-PDSCH data transmission timing information, it delivers this information to the control portion 35 and supplies the synthesis portion 38 with transmission timing information to be sent to an adjacent base station.

The synthesis portion 38 combines control information from the control portion 35, transmission timing information from the transmission timing detection and notification portion 37, and some input signals externally supplied, e.g., signals from the call control portion and the speech input portion of the mobile station 3. The information combined by the synthesis portion 38 is sent out as an upstream-line individual-communication signal DPCH (UL) from the antenna 31 through the transmitting portion 39 and the transmitting and receiving shared device 32.

Each of the mobile stations 3-1 to 3-4 shown in FIG. 1 has the same configuration (not shown) as the above-described configuration of the mobile station 3 shown in FIG. 3 and operates in the same manner as the mobile station 3.

Figure 4:
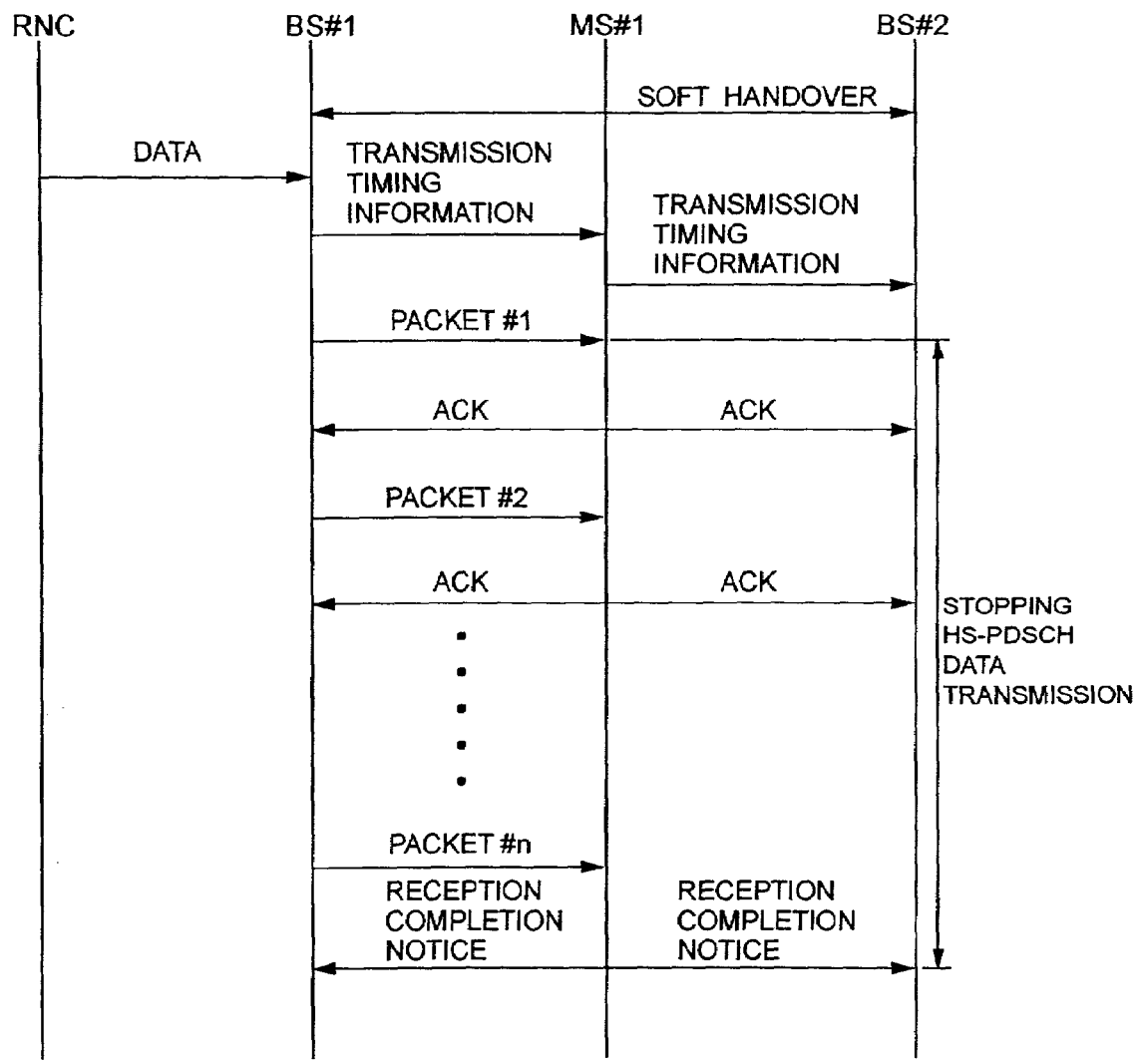
FIG. 4 is a sequence chart showing processing for controlling HS-PDSCH data transmission timing in accordance with the first embodiment of the present invention.
Figure 5:
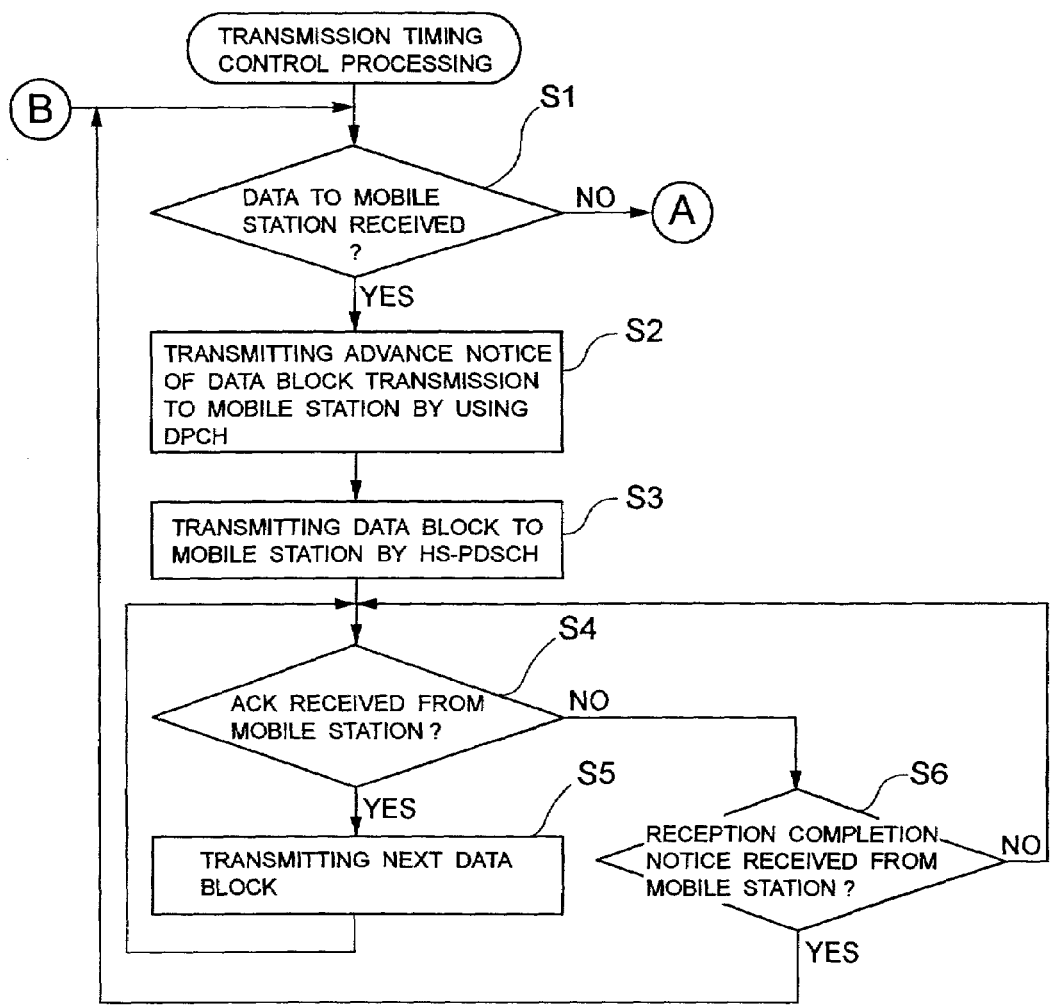
FIG. 5 is a flowchart showing processing for controlling HS-PDSCH data transmission timing in the base station shown in FIG. 1 in accordance with the first embodiment of the present invention.
Figure 6:
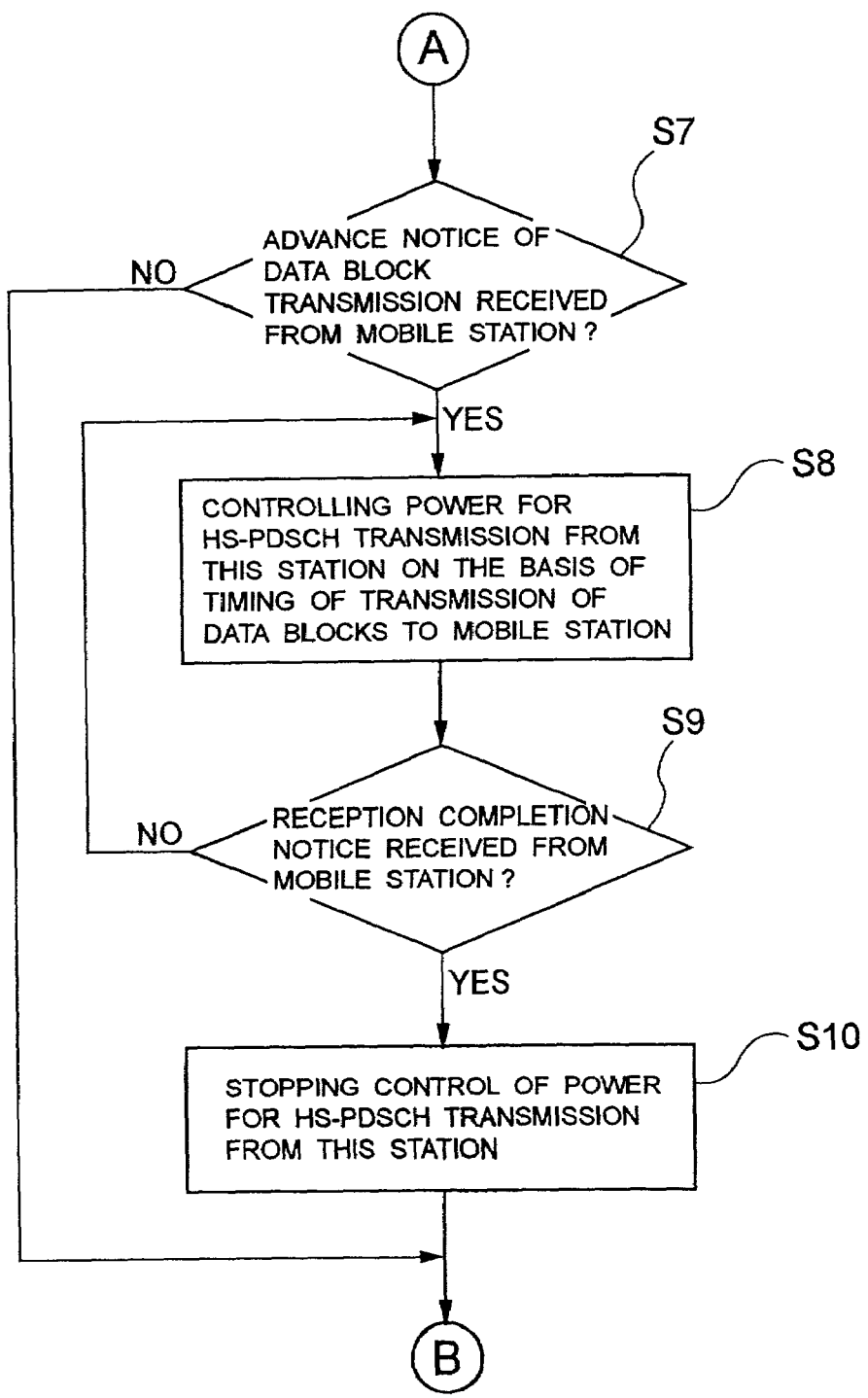
FIG. 6 is a flowchart showing processing for controlling HS-PDSCH data transmission timing in the base station shown in FIG. 1 in accordance with the first embodiment of the present invention.
Figure 7:
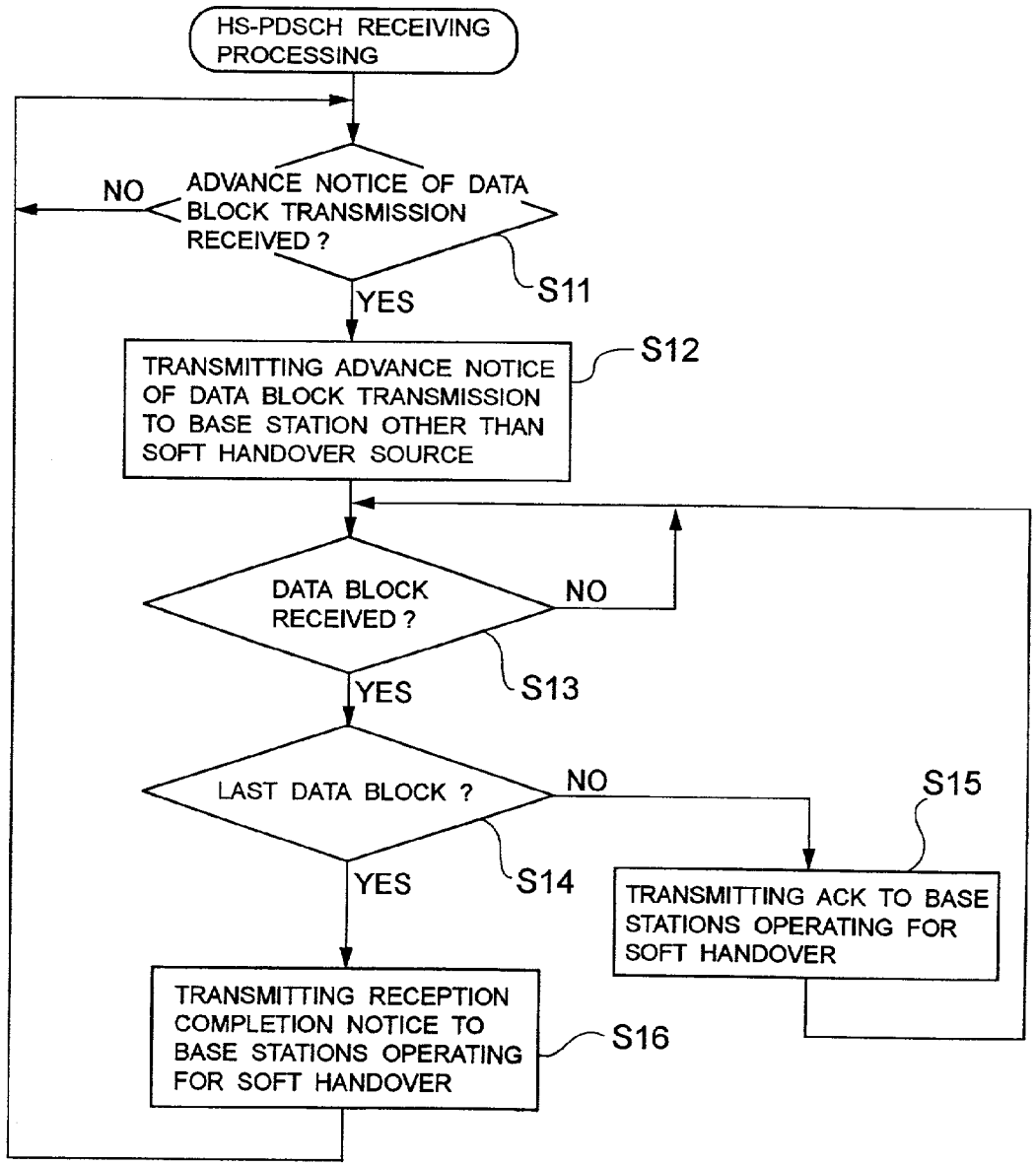
FIG. 7 is a flowchart showing HS-PDSCH data receiving processing in the mobile station shown in FIG. 1 in accordance with the first embodiment of the present invention.

FIG. 4 is a sequence chart showing processing for controlling HS-PDSCH data transmission timing in accordance with the first embodiment of the present invention. FIGS. 5 and 6 are flowcharts showing processing for controlling HS-PDSCH data transmission timing in the base stations 1-1 and 1-2 shown in FIG. 1 in accordance with the first embodiment of the present invention. FIG. 7 is a flowchart showing HS-PDSCH data receiving processing in the mobile station 3-1 shown in FIG. 1 in accordance with the first embodiment of the present invention. Transmitting and receiving of HS-PDSCH data in accordance with the first embodiment of the present invention will be described with reference to FIGS. 1 through 7. In FIG. 4, RNC represents the base station controller 2, BS#1 and BS#2 respectively represent the base stations 1-1 and 1-2, and MS#1 represents the mobile station 3-1. It is assumed that the mobile station 3-1 is being handed over in a soft handover manner between the base stations 1-1 and 1-2.

When data to be transmitted to the mobile station 3-1 is supplied from the base station controller 2 to the base station 1-1 (step S1 in FIG. 5), the base station 1-1 transmits an advance notice of transmission of HS-PDSCH data blocks to the mobile station 3-1 by using an individual-communication signal over a downstream line (step S2 in FIG. 5). Thereafter the base station 1-1 starts transmitting HS-PDSCH data blocks to the mobile station 3-1 (step S3 in FIG. 5).

When the mobile station 3-1 receives the advance notice of transmission of HS-PDSCH data blocks from the base station 1-1 (step S11 in FIG. 7), it transmits the data block transmission advance notice as transmission timing information to the base station 1-2 (step S12 in FIG. 7).

When the mobile station 3-1 receives one HS-PDSCH data block (packet #1, #2, . . . ) from the base station 1-1 (step S13 in FIG. 7), it transmits an acknowledgement (ACK) of the reception of the data block to the base stations 1-1 and 1-2 operating for soft handover (step S15 in FIG. 7) if the received data block is not the last one (step S14 in FIG. 7).

Each time the base station 1-1 receives the data block reception acknowledgement from the mobile station 3-1 (step S4 in FIG. 5), it successively transmits the next data block to the mobile station 3-1 (step S5 in FIG. 5).

On the other hand, when the base station 1-2 receives the transmission timing information from the mobile station 3-1 (step S7 in FIG. 6), it controls the power for transmission of HS-PDSCH data blocks from itself to another base station 3-2 or 3-4 on the basis of the timing of transmission of data blocks from the base station 1-1 to the mobile station 3-1 (step S8 in FIG. 6).

When the mobile station 3-1 receives the last data block (packet #n) from the base station 1-1 (step S14 in FIG. 7), it transmits a data block reception completion notice to the base stations 1-1 and 1-2 operating for soft handover (step S16 in FIG. 7).

When the base station 1-1 receives the data block reception completion notice from the mobile station 3-1 (step S6 in FIG. 5), the process returns to step S1 and the base station 1-1 waits for the next data from the base station controller 2. When the base station 1-2 receives the data block reception completion notice from the mobile station 3-1 (step S9 in FIG. 6), it stops controlling the power for transmission of HS-PDSCH data blocks from itself to the other mobile station 3-2 or 3-4 (step S10 in FIG. 6). Then the process returns to step S1 and the next data from the base station controller 2 or transmission timing information from the mobile stations 3-1, 3-2, and 3-4 is awaited.

As described above, large interference by HS-PDSCH from the adjacent cell 102 having a small propagation loss difference is reduced to improve the transmission rate of HS-PDSCH transmission from the base station 1-1 to the mobile station 3-1 in the vicinity of the cell boundary 101.

In actuality, even in a case where HS-PDSCH data is transmitted from the base station 1-1 with a propagation loss which is not the smallest, large interference caused by HS-PDSCH data transmitted from the base station 1-2 with the smallest propagation loss to the other mobile station 3-2 or 3-4 can be reduced. That is, at the mobile station 3-1, while multipath interference can be cancelled, it is difficult to cancel interference from the other base station 1-2. However, large interference by HS-PDSCH data transmitted from the base station 1-2 with the smallest propagation loss to the other mobile station 3-2 or 3-4 can be reduced as described above. Reducing this interference is markedly effective in improving the transmission rate of HS-PDSCH transmission from the base station 1-1 to the mobile station 3-11.

In this case, HS-PDSCH transmission in the adjacent cell 102 may be slightly delayed to improve the throughput of the entire system. Also, simultaneous execution of transmitting operations is prevented to avoid application of strong interfering waves to the mobile station 3-1 in the vicinity of the cell boundary. Twofold or more increase in the rate of transmission to the mobile station 3-1 is thereby achieved to increase the throughput per cell.

In particular, the proportions of noise power and interfering wave power are increased in the vicinity of a cell boundary since signal power is lower. Correspondingly, the signal interference ratio (SIR) is lower and the transmission rate is reduced. Under this condition, the time during which a channel is used to transmit a certain amount of data to the mobile station 3-1 is longer than the time during which a channel is used to transmit the same amount of data to the mobile station 3-2, 3-3, or 3-4 located away from the cell boundary. Increasing the transmission rate for the mobile station 3-1 under such a condition is effective in increasing the throughput of the entire system.

On the other hand, when HS-PDSCH transmission to the mobile station 3-1 in the vicinity of the cell boundary is not performed in each of the cells 101 and 102, interfering wave power applied to each of the mobile stations 3-2 to 3-4 is not high even if packets are simultaneously transmitted through the adjacent cells 101 and 102. In this case, the reduction in transmission rate is comparatively small and packet transmission operations in the adjacent cells 101 and 102 may be simultaneously performed to improve the throughput of the entire system.

As described above, a decision is made on whether to simultaneously transmit packets to the mobile stations 3-1 to 3-4 in the cell according to the states of transmission in adjacent cells 101 and 102. In this manner, the throughput of the entire system can be maximized in any situation.

In this embodiment, each of the base stations 1-1 and 1-2 receives a data block reception completion notice from the mobile station 3-1. Alternatively, each base station may detect, as the completion of reception of data blocks, a lapse of a predetermined time period during which no data block is received from the mobile station 3-1 after reception of a data block reception acknowledgment (ACK) or a negative acknowledgment (NACK) from the mobile station 3-1. The base station may stop controlling the power for transmission of HS-PDSCH data blocks in response to this detection. The same can also be said in the following description.

Figure 8:
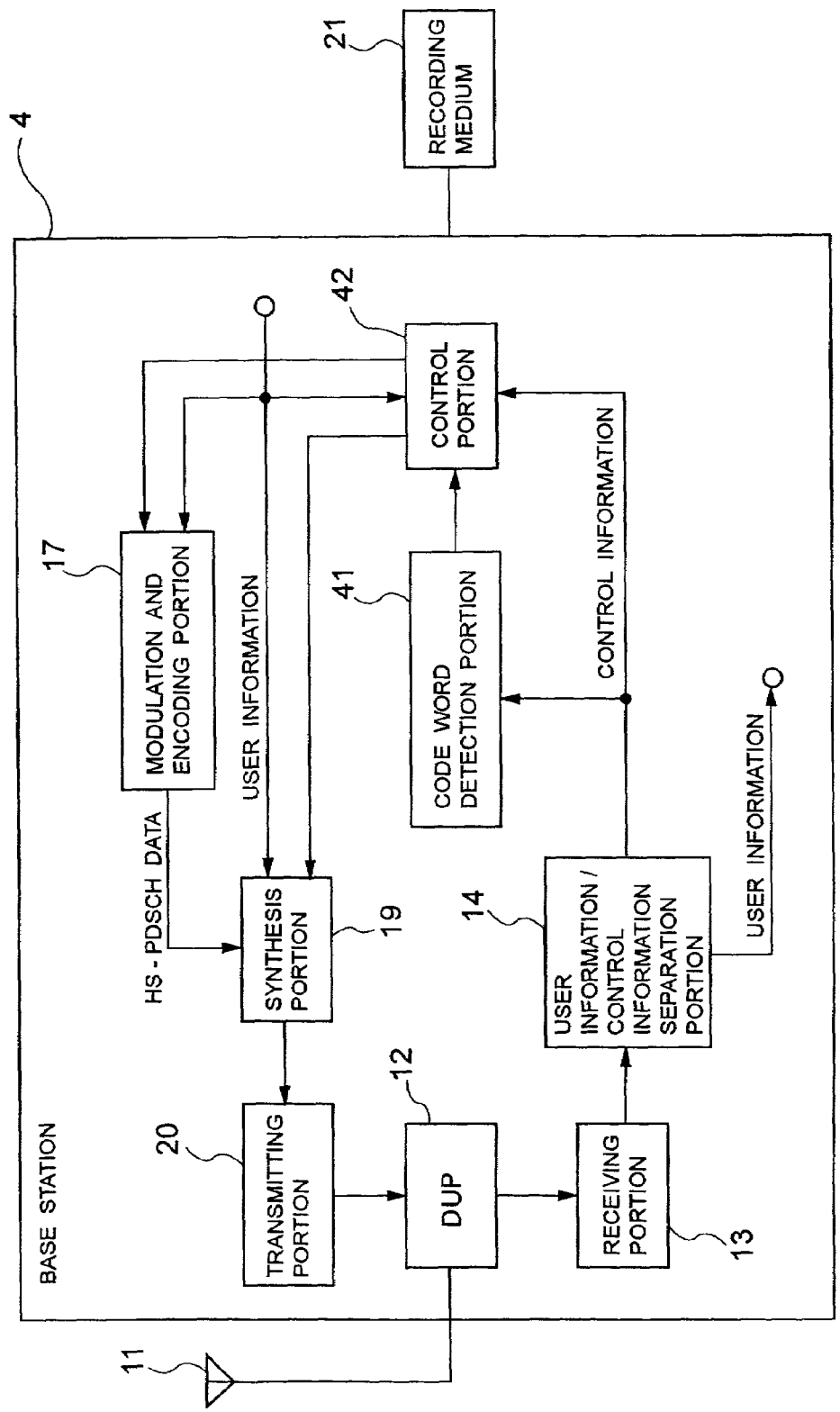
FIG. 8 is a block diagram showing a configuration of a base station in a second embodiment of the present invention.

FIG. 8 is a block diagram showing a configuration of a base station in a second embodiment of the present invention. Referring to FIG. 8, a base station 4 in the second embodiment of the present invention has the same configuration as the base station 1 in the first embodiment of the present invention shown in FIG. 2 except that a code word detection portion 41 and a control portion 42 for performing control according to detection results from the code word detection portion 41 are provided in place of the transmission timing detection portion 15 and the control portion 16. Components identical or corresponding to those in the first embodiment of the present invention are indicated by the same reference characters. The corresponding components operate in the same manner as those of the first embodiment.

The code word detection portion 41 detects, in a signal from a base station controller (not shown), an identification code assigned to the base station to which it belongs, holds the detected identification code, and compares the held identification code with a code word received from a mobile station (not shown) to be handed over in a soft handover manner. If the code word detection portion 41 recognizes that the compared codes coincide with each other, it notifies the control portion 42 of this comparison result. The control portion 42 receiving the notice of the coincidence of the identification code with the received code word controls the power for transmission of HS-PDSCH data to other mobile stations (not shown).

Figure 9:
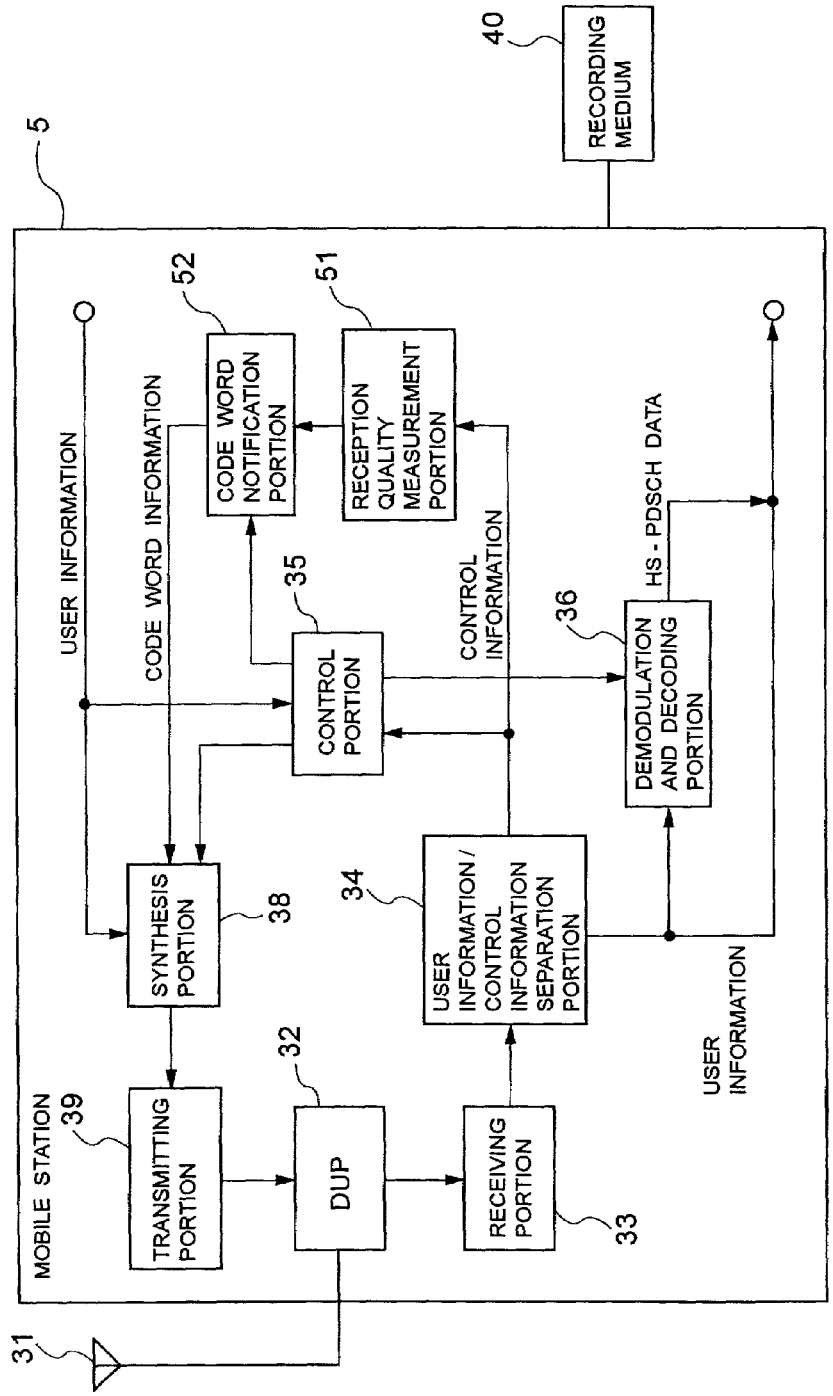
FIG. 9 is a block diagram showing a configuration of a mobile station in the second embodiment of the present invention.

FIG. 9 is a block diagram showing a configuration of a mobile station in the second embodiment of the present invention. Referring to FIG. 9, a mobile station 5 in the second embodiment of the present invention has the same configuration as the mobile station 3 in the first embodiment of the present invention shown in FIG. 3 except that a reception quality measurement portion 51 and a code word notification portion 52 are provided in place of the transmission timing detection and notification portion 37. Components identical or corresponding to those in the first embodiment of the present invention are indicated by the same reference characters. The corresponding components operate in the same manner as those of the first embodiment.

The reception quality measurement portion 51 measures the quality of reception of the common pilot signal separated by the user information/control information separation portion 34 and notifies the code word notification portion 52 of the measurement result. If the difference between the measured qualities of reception of the common pilot signal from base stations (not shown) operating for soft handover is larger than a threshold value set in advance, the code word notification portion 52 supplies the synthesis portion 38 with a code word which represents the identification code of a base station other than the base station which will transmit HS-PDSCH data. The code word notification portion 52 notifies the base station of the code word by using an individual-communication signal over an upstream line.

The mobile communication system (not shown) of the second embodiment of the present information has the same configuration as that of the system shown in FIG. 1, and the base station 4 shown in FIG. 8 has the same configuration and operates in the same manner as the base stations 1-1 and 1-2 shown in FIG. 1. Also, the mobile station 5 shown in FIG. 9 has the same configuration and operates in the same manner as the mobile stations 3-1 to 3-4 shown in FIG. 1.

Figure 10:
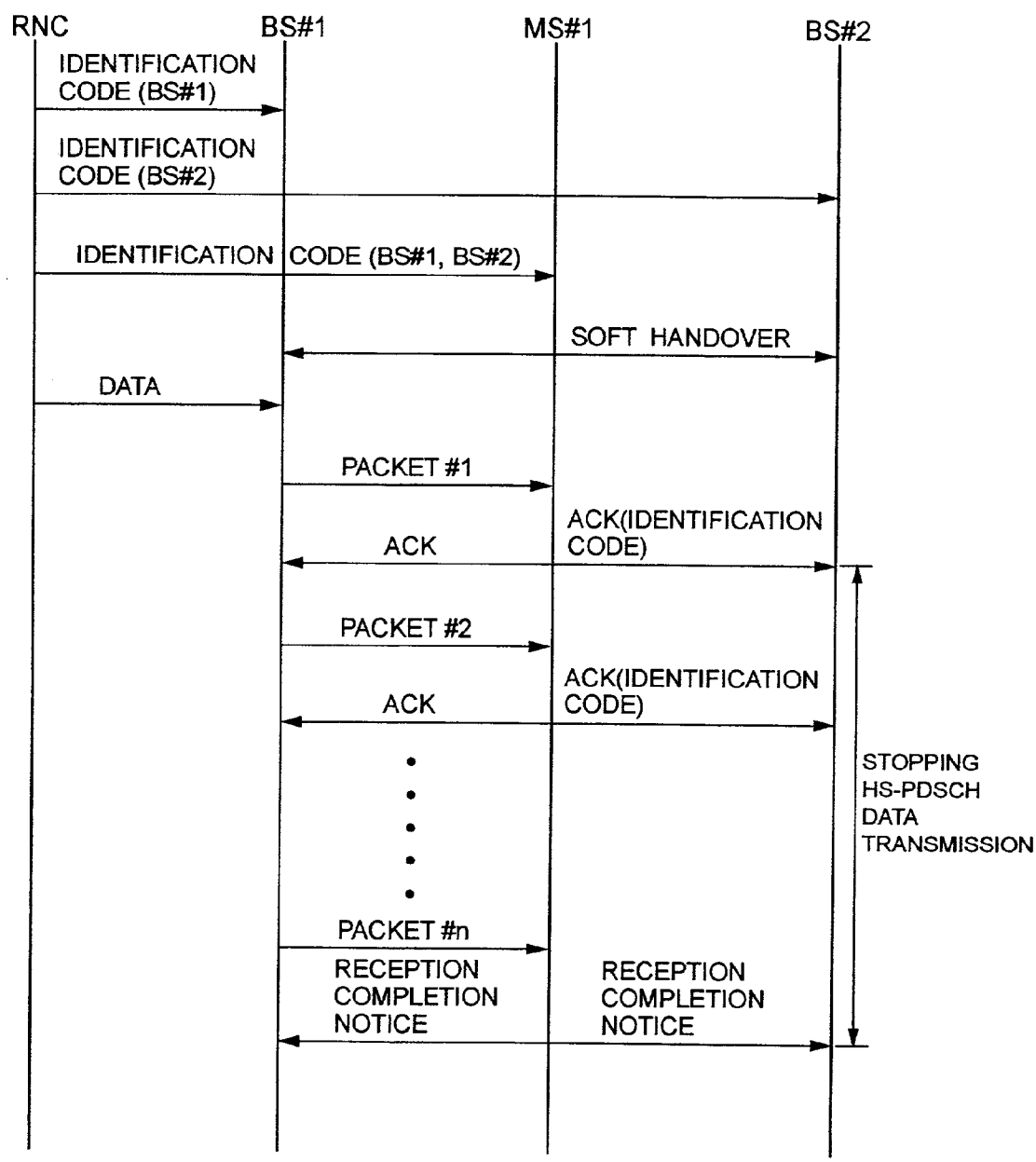
FIG. 10 is a sequence chart showing processing for controlling HS-PDSCH data transmission timing in accordance with the second embodiment of the present invention.
Figure 11:
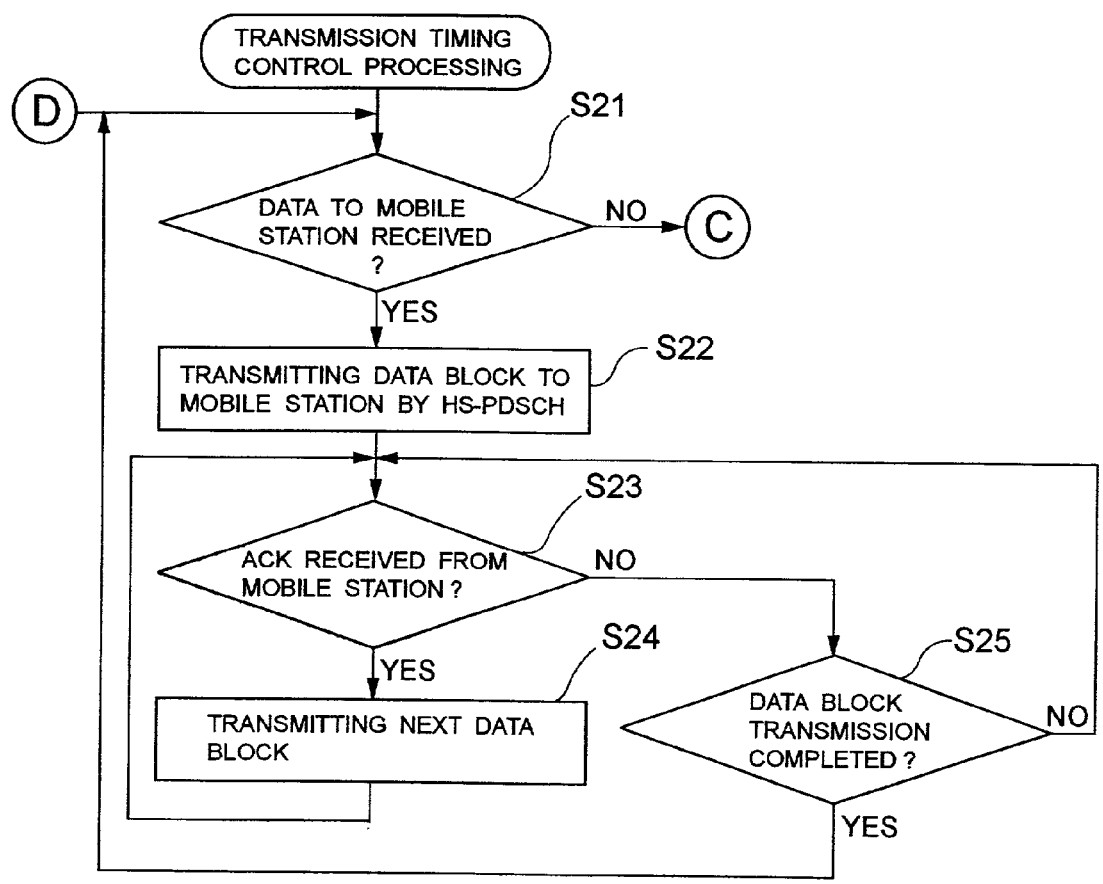
FIG. 11 is a flowchart showing processing for controlling HS-PDSCH data transmission timing in the base station shown in FIG. 1 in accordance with the second embodiment of the present invention.
Figure 12:
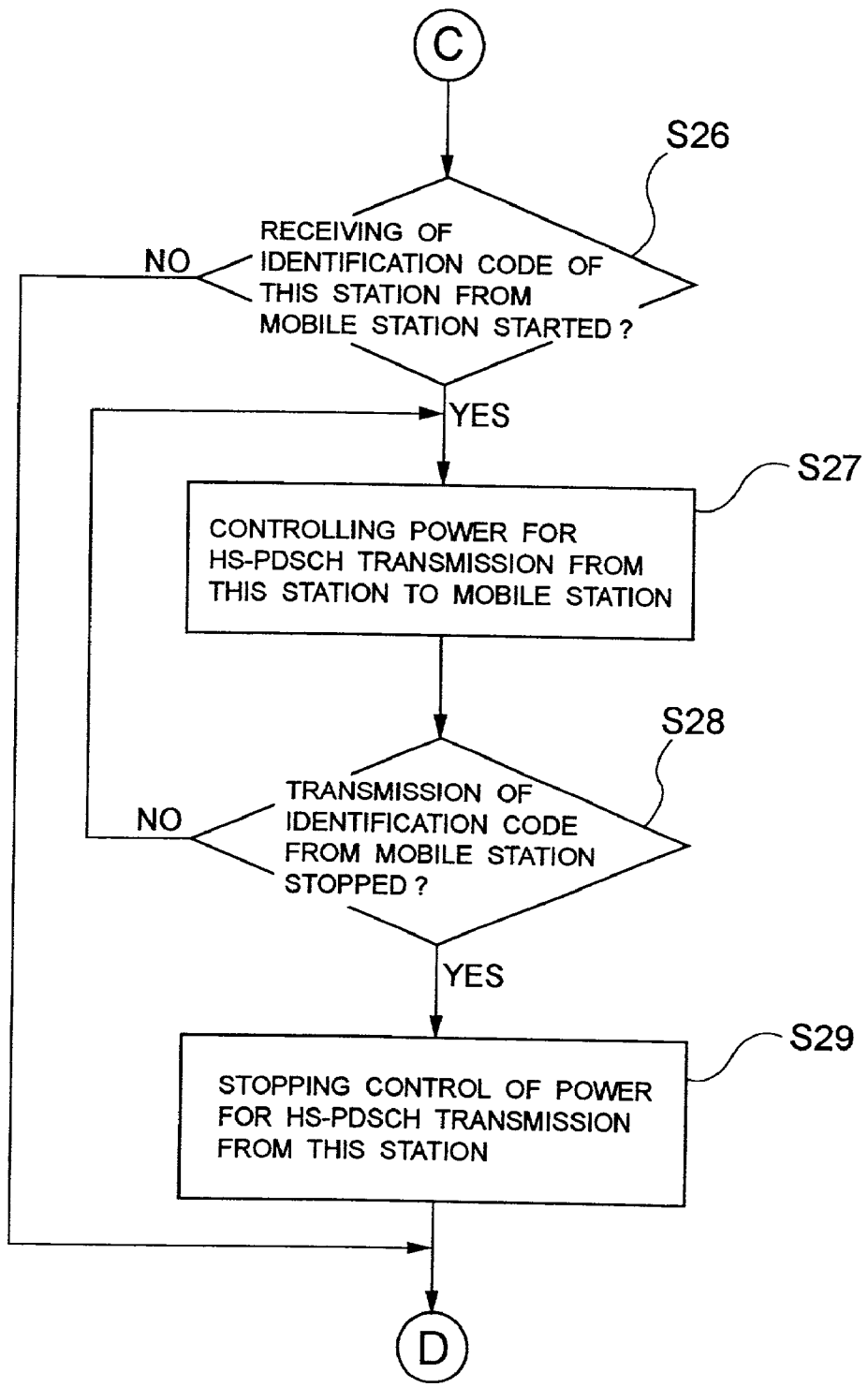
FIG. 12 is a flowchart showing processing for controlling HS-PDSCH data transmission timing in the base station shown in FIG. 1 in accordance with the second embodiment of the present invention.
Figure 13:
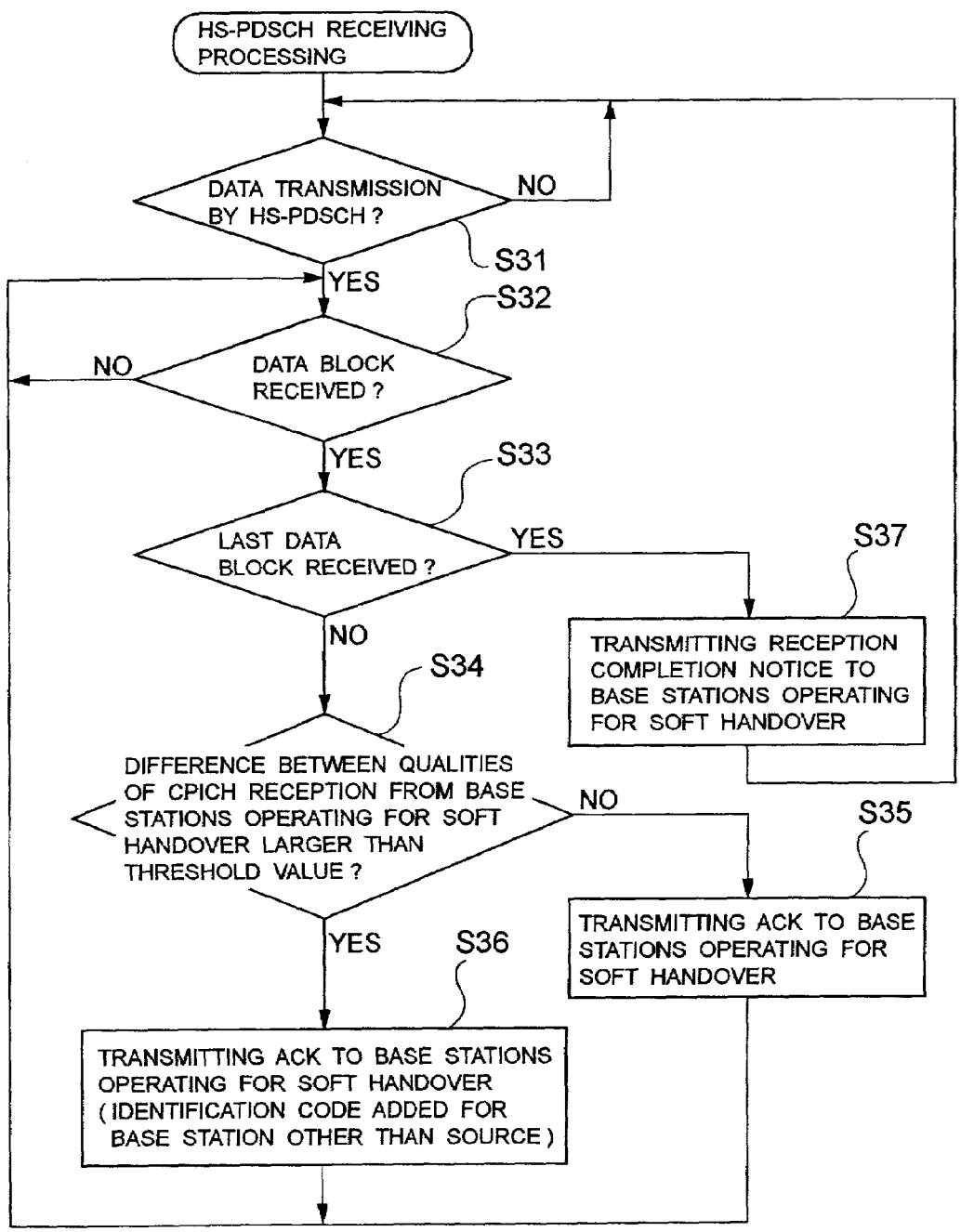
FIG. 13 is a flowchart showing HS-PDSCH data receiving processing in the mobile station shown in FIG. 1 in accordance with the second embodiment of the present invention.

FIG. 10 is a sequence chart showing processing for controlling HS-PDSCH data transmission timing in accordance with the second embodiment of the present invention. FIGS. 11 and 12 are flowcharts showing processing for controlling HS-PDSCH data transmission timing in the base stations 1-1 and 1-2 shown in FIG. 1 in accordance with the second embodiment of the present invention. FIG. 13 is a flowchart showing HS-PDSCH data receiving processing in the mobile station 3-1 shown in FIG. 1 in accordance with the second embodiment of the present invention. Transmitting and receiving of HS-PDSCH data in accordance with the second embodiment of the present invention will be described with reference to FIGS. 1 and 8 to 13. In FIG. 10, RNC represents the base station controller 2, BS#1 and BS#2 respectively represent the base stations 1-1 and 1-2, and MS#1 represents the mobile station 3-1. It is assumed that the mobile station 3-1 is being handed over in a soft handover manner between the base stations 1-1 and 1-2.

The base station controller 2 determines identification codes for the base stations 1-1 and 1-2. The base station controller 2 selects unique codes so as not to be duplicated each other, for example, from a, b, c, . . . , h as identification codes for the base stations 1-1 and 1-2. Thereafter the base station controller 2 notifies the base stations 1-1 and 1-2 of the respective identification codes determined and also notifies the mobile station 3-1 of the identification codes of the base stations 1-1 and 1-2.

When data to be transmitted to the mobile station 3-1 is supplied from the base station controller 2 to the base station 1-1 (step S21 in FIG. 11), the base station 1-1 starts transmitting HS-PDSCH data blocks to the mobile station 3-1 (step S22 in FIG. 11).

When the mobile station 3-1 receives one HS-PDSCH data block (packet #1, #2, . . . ) from the base station 1-1 (steps S31 and S32 in FIG. 13), it operates as described below if the received data block is not the last one (step S33 in FIG. 13). The reception quality measurement portion 51 measures the quality of reception of the common pilot signal from each of the base stations 1-1 and 1-2 operating for soft handover and determines whether the difference between the reception qualities is larger than a threshold value set in advance (step S34 in FIG. 13). If the difference between the reception qualities is not larger than the threshold value, the mobile station 3-1 transmits a data block reception acknowledgement (ACK) to the base stations 1-1 and 1-2 operating for soft handover (step S35 in FIG. 13).

If the difference between the reception qualities is larger than the threshold value, the mobile station 3-1 transmits a data block reception acknowledgement (ACK) to the base station 1-1 transmitting the HS-PDSCH data block and transmits a data block reception acknowledgement with a code word notified from the code word notification portion 52 added, to the base station 1-2 transmitting no HS-PDSCH data block to the mobile station 3-1 (step S36 in FIG. 13).

Each time the base station 1-1 receives the data block reception acknowledgement from the mobile station 3-1 (step S23 in FIG. 11), it successively transmits the next data block to the mobile station 3-1 (step S24 in FIG. 11).

On the other hand, if the code word added to the data block reception acknowledgement from the mobile station 3-1 received by the base station 1-2 coincides with the identification code for the base station 1-2 (step S26 in FIG. 12), the base station 1-2 controls the power for transmission of HS-PDSCH data blocks from itself to another mobile station 3-2 or 3-4 (step S27 in FIG. 12). As long as the same code word is added to the data block reception acknowledgement from the mobile station 3-1, the base station 1-2 controls the power for transmission of HS-PDSCH data blocks from itself to the other mobile station 3-2 or 3-4.

When the mobile station 3-1 receives the last data block (packet #n) from the base station 1-1 (step S33 in FIG. 13), it transmits a data block reception completion notice to the base stations 1-1 and 1-2 operating for soft handover (step S37 in FIG. 13).

When the base station 1-1 receives the data block reception completion notice from the mobile station 3-1 (step S25 in FIG. 11), the process returns to step S21 and the base station 1-1 waits for the next data from the base station controller 2. When the base station 1-2 receives the data block reception completion notice from the mobile station 3-1, that is, when transmission of the code word representing its identification code from the mobile station 3-1 is stopped (step S28 in FIG. 12), it stops controlling the power for transmission of HS-PDSCH data blocks from itself to the other mobile station 3-2 or 3-4 (step S29 in FIG. 12). Then the process returns to step S21 and the next data from the base station controller 2 or the code words from the mobile stations 3-1, 3-2, or 3-4 is awaited.

Since the base stations 1-1 and 1-2 for soft handover are determined through base station controller 2, there is a delay in updating the base stations 1-1 and 1-2. Therefore, even between base stations with which a large propagation loss exits already, soft handover of the individual-transmission signals is performed during the updating delay time.

For this reason, if as in the first embodiment the base station 1-2 is always made to control the power for transmission of HS-PDSCH data when the base station 1-1 transmits HS-PDSCH data to the mobile station 3-1, the base station 1-2 controls the power for transmission of HS-PDSCH data even in a case where transmission of HS-PDSCH data from the base station 1-2 does not cause large interference with the mobile station 3-1. In such a case, the throughput of the base station 1-2 is reduced even though the throughput of the mobile station 3-1 is not actually improved, resulting in a reduction in throughput of the entire system.

In contract, in this embodiment, the mobile station 3-1 measures the quality of reception of the common pilot signal from each of the base stations 1-1 and 1-2, and directly sends to the base station 1-2 the necessary information if the interference from the base station 1-2 is higher than a certain level. Thus, the power for transmission of HS-PDSCH data from the base station 1-2 to the other mobile station 3-2 or 3-4 can be controlled only when large interference with the mobile station 3-1 is actually caused, thereby maximizing the throughput of the entire system.

Also, even when the mobile station 3-1 and the base stations 1-1 and 1-2 are transmitting and receiving individual-communication signals, transmission of HS-PDSCH data from the base station 1-2 to the other mobile station 3-2 or 3-4 is performed in the ordinary manner if the propagation loss difference between the base stations 1-1 and 1-2 is large. In this case, the interference from the base station 1-2 with the mobile station 3-1 is small. Thus, the throughput of the entire system can be maximized. The other effects of this embodiment are the same as those of the first embodiment.

Figure 14:
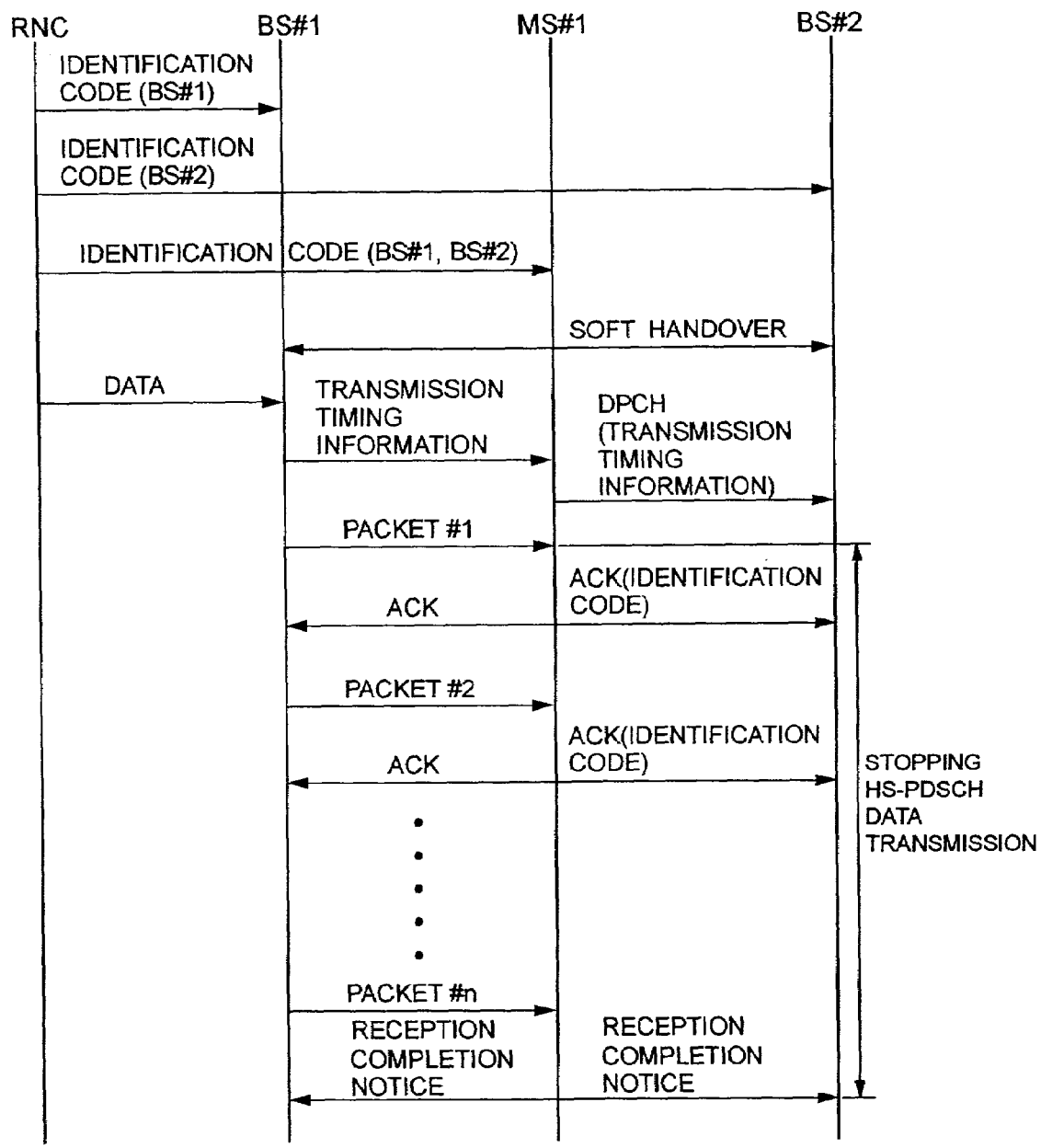
FIG. 14 is a sequence chart showing processing for controlling HS-PDSCH data transmission timing in accordance with a third embodiment of the present invention.
Figure 15:
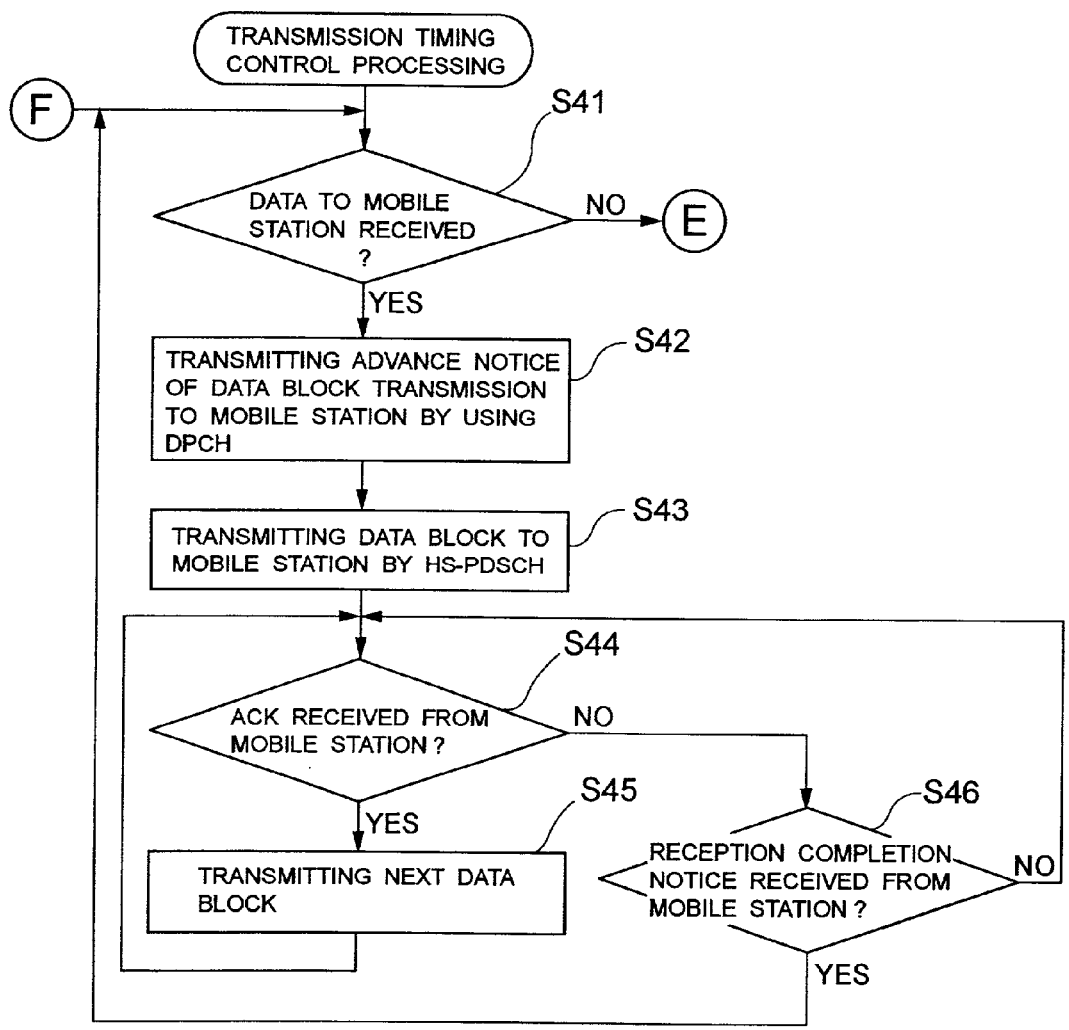
FIG. 15 is a flowchart showing processing for controlling HS-PDSCH data transmission timing in the base station shown in FIG. 1 in accordance with the third embodiment of the present invention.
Figure 16:
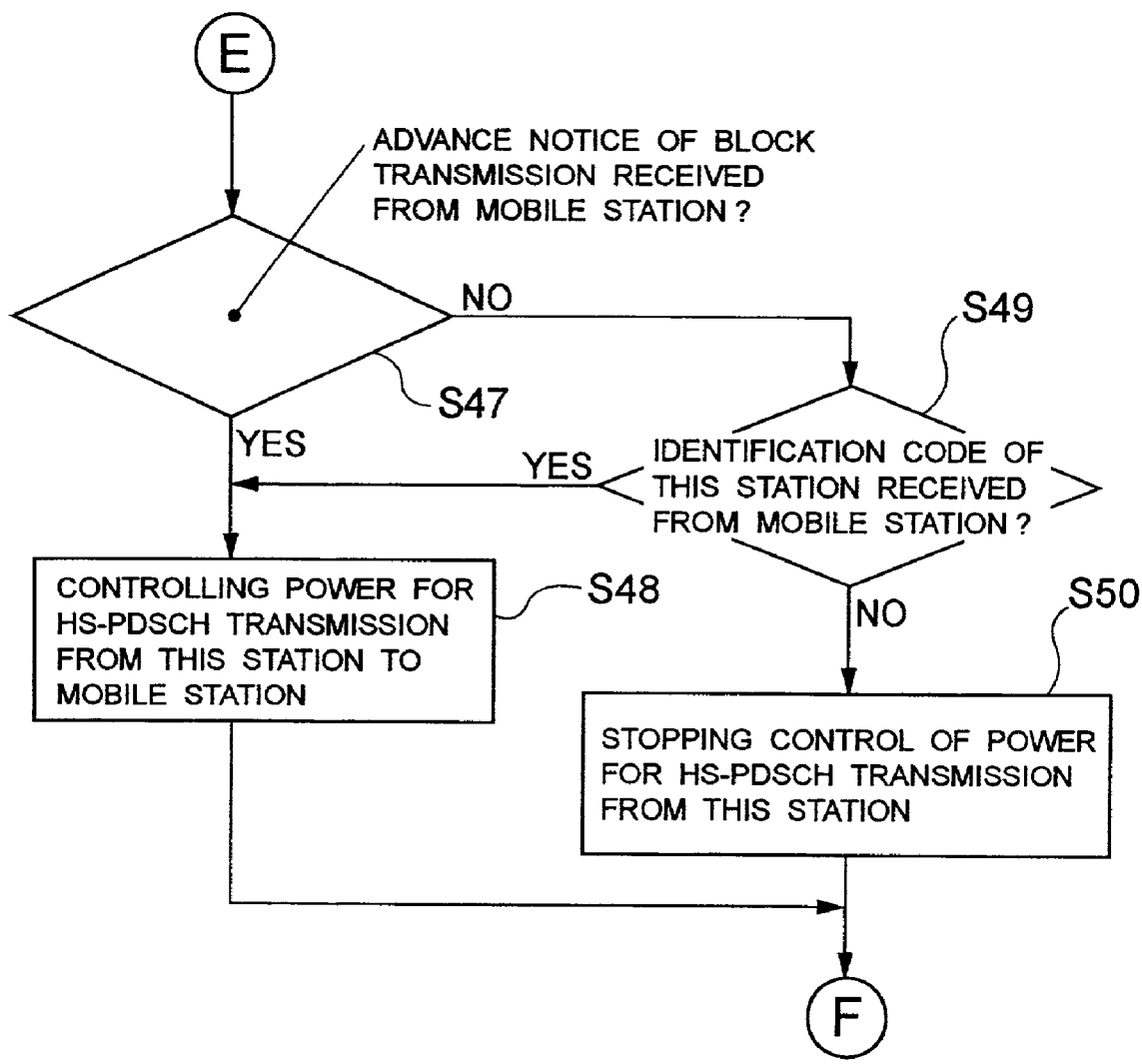
FIG. 16 is a flowchart showing processing for controlling HS-PDSCH data transmission timing in the base station shown in FIG. 1 in accordance with the third embodiment of the present invention.
Figure 17:
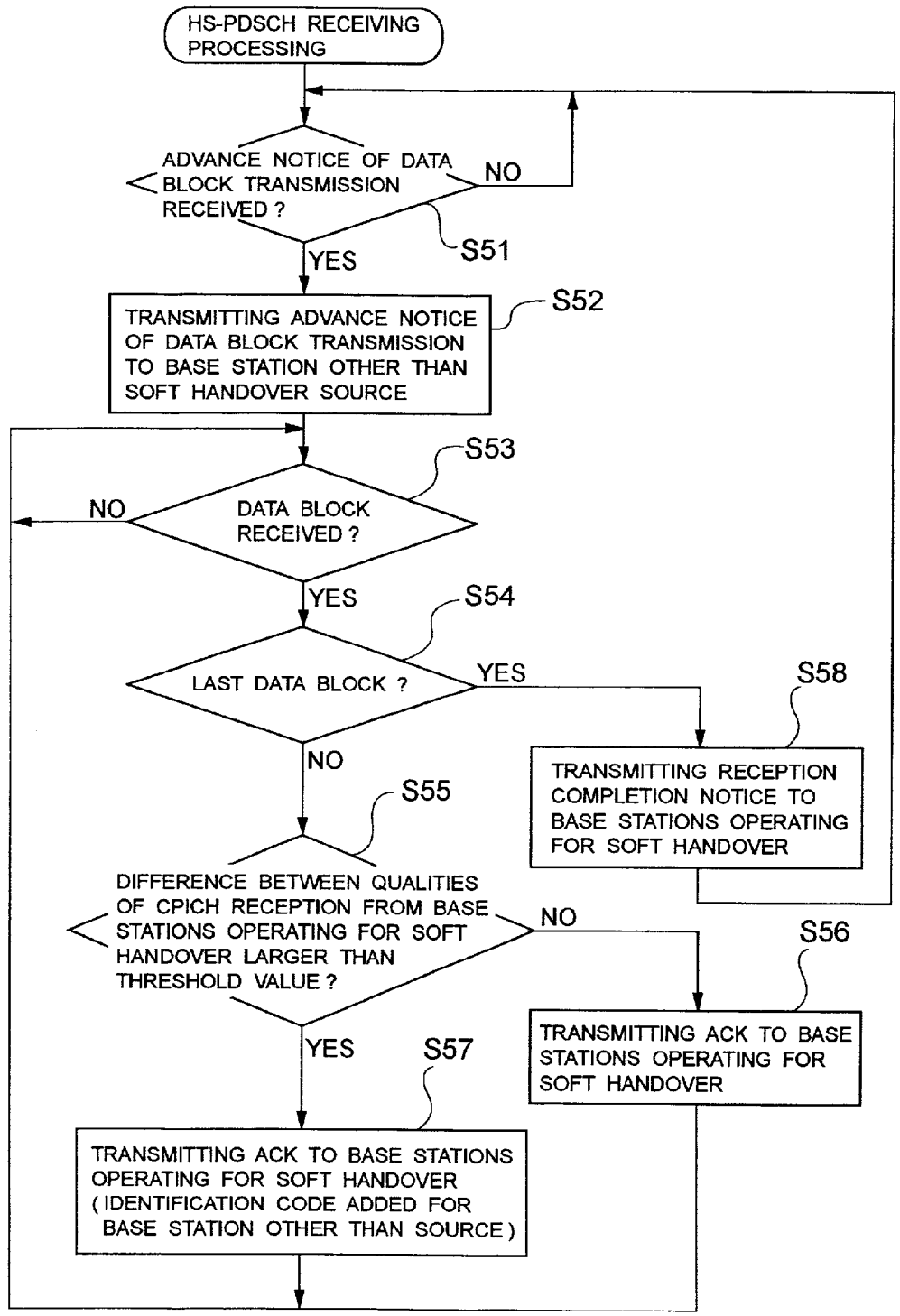
FIG. 17 is a flowchart showing HS-PDSCH data receiving processing in the mobile station shown in FIG. 1 in accordance with the third embodiment of the present invention.

FIG. 14 is a sequence chart showing processing for controlling HS-PDSCH data transmission timing in accordance with a third embodiment of the present invention. FIGS. 15 and 16 are flowcharts showing processing for controlling HS-PDSCH data transmission timing in the base stations 1-1 and 1-2 shown in FIG. 1 in accordance with the third embodiment of the present invention. FIG. 17 is a flowchart showing HS-PDSCH data receiving processing in the mobile station 3-1 shown in FIG. 1 in accordance with the third embodiment of the present invention. Transmitting and receiving of HS-PDSCH data in accordance with the third embodiment of the present invention will be described with reference to FIGS. 1 and 14 to 17. In FIG. 14, RNC represents the base station controller 2, BS#1 and BS#2 respectively represent the base stations 1-1 and 1-2, and MS#1 represents the mobile station 3-1. It is assumed that the mobile station 3-1 is being handed over in a soft handover manner between the base stations 1-1 and 1-2.

The mobile communication system (not shown) of the third embodiment has the same configuration as that of the system shown in FIG. 1, and the base station 4 shown in FIG. 8 has the same configuration and operates in the same manner as the base stations 1-1 and 1-2 shown in FIG. 1. Also, the mobile station 5 shown in FIG. 9 has the same configuration and operates in the same manner as the mobile stations 3-1 to 3-4 shown in FIG. 1.

The base station controller 2 determines identification codes for the base stations 1-1 and 1-2. The base station controller 2 selects unique codes so as not to be duplicated each other, for example, from a, b, c, . . . , h as identification codes for the base stations 1-1 and 1-2. Thereafter the base station controller 2 notifies the base stations 1-1 and 1-2 of the respective identification codes determined and also notifies the mobile station 3-1 of the identification codes of the base stations 1-1 and 1-2.

When data to be transmitted to the mobile station 3-1 is supplied from the base station controller 2 to the base station 1-1 (step S41 in FIG. 15), the base station 1-1 transmits an advance notice of transmission of HS-PDSCH data blocks to the mobile station 3-1 by using an individual-communication signal over a downstream line (step S42 in FIG. 15). Thereafter the base station 1-1 starts transmitting HS-PDSCH data blocks to the mobile station 3-1 (step S43 in FIG. 15).

When the mobile station 3-1 receives the advance notice of transmission of HS-PDSCH data blocks from the base station 1-1 (step S51 in FIG. 17), it transmits the data block transmission advance notice as transmission timing information to the base station 1-2 (step S52 in FIG. 17).

When the mobile station 3-1 receives one HS-PDSCH data block (packet #1, #2, . . . ) from the base station 1-1 (step S53 in FIG. 17), it operates as described below if the received data block is not the last one (step S54 in FIG. 17). The reception quality measurement portion 51 measures the quality of reception of the common pilot signal from each of the base stations 1-1 and 1-2 operating for soft handover and determines whether the difference between the reception qualities is larger than a threshold value set in advance (step S55 in FIG. 17). If the difference between the reception qualities is not larger than the threshold value, the mobile station 3-1 transmits a data block reception acknowledgement (ACK) to the base stations 1-1 and 1-2 operating for soft handover (step S56 in FIG. 17).

If the difference between the reception qualities is larger than the threshold value, the mobile station 3-1 transmits a data block reception acknowledgement (ACK) to the base station 1-1 transmitting the HS-PDSCH data block and transmits a data block reception acknowledgement with a code word notified from the code word notification portion 52 added to the base station 1-2 transmitting no HS-PDSCH data block to the mobile station 3-1 (step S57 in FIG. 17).

Each time the base station 1-1 receives the data block reception acknowledgement from the mobile station 3-1 (step S44 in FIG. 15), it successively transmits the next data block to the mobile station 3-1 (step S45 in FIG. 15).

On the other hand, when the base station 1-2 receives the transmission timing information from the mobile station 3-1 (step S47 in FIG. 16), it controls the power for transmission of HS-PDSCH blocks from itself to another base station 3-2 or 3-4 on the basis of the timing of transmission of data blocks from the base station 1-1 to the mobile station 3-1 (step S48 in FIG. 16). As long as the same code word is added to the data block reception acknowledgement from the mobile station 3-1, the base station 1-2 controls the power for transmission of HS-PDSCH data blocks from itself to the other mobile station 3-2 or 3-4.

When the mobile station 3-1 receives the last data block (packet #n) from the base station 1-1 (step S54 in FIG. 17), it transmits a data block reception completion notice to the base stations 1-1 and 1-2 operating for soft handover (step S58 in FIG. 7).

When the base station 1-1 receives the data block reception completion notice from the mobile station 3-1 (step S46 in FIG. 15), the process returns to step S41 and the base station 1-1 waits for the next data from the base station controller 2. When the base station 1-2 receives the data block reception completion notice from the mobile station 3-1, that is, when transmission of the code word representing its identification code from the mobile station 3-1 is stopped (step S49 in FIG. 16), it stops controlling the power for transmission of HS-PDSCH data blocks from itself to the other mobile station 3-2 or 3-4 (step S50 in FIG. 16). Then the process returns to step S41 and the next data from the base station controller 2 or transmission timing information from the mobile stations 3-1, 3-2, and 3-4 is awaited.

In this embodiment, the base station 1-2 controls the power for transmission of HS-PDSCH data blocks on the basis of transmission timing information from the mobile station 3-1 instead of starting controlling the power for transmission of HS-PDSCH data blocks after the arrival of the code word from the mobile station 3-1 as in the second embodiment of the present invention. Therefore, even in a case where the interference from the base station 1-2 is large from the outset, a throughput improvement effect can be immediately obtained. The other effects of this embodiment are the same as those of the second embodiment.

Figure 18:
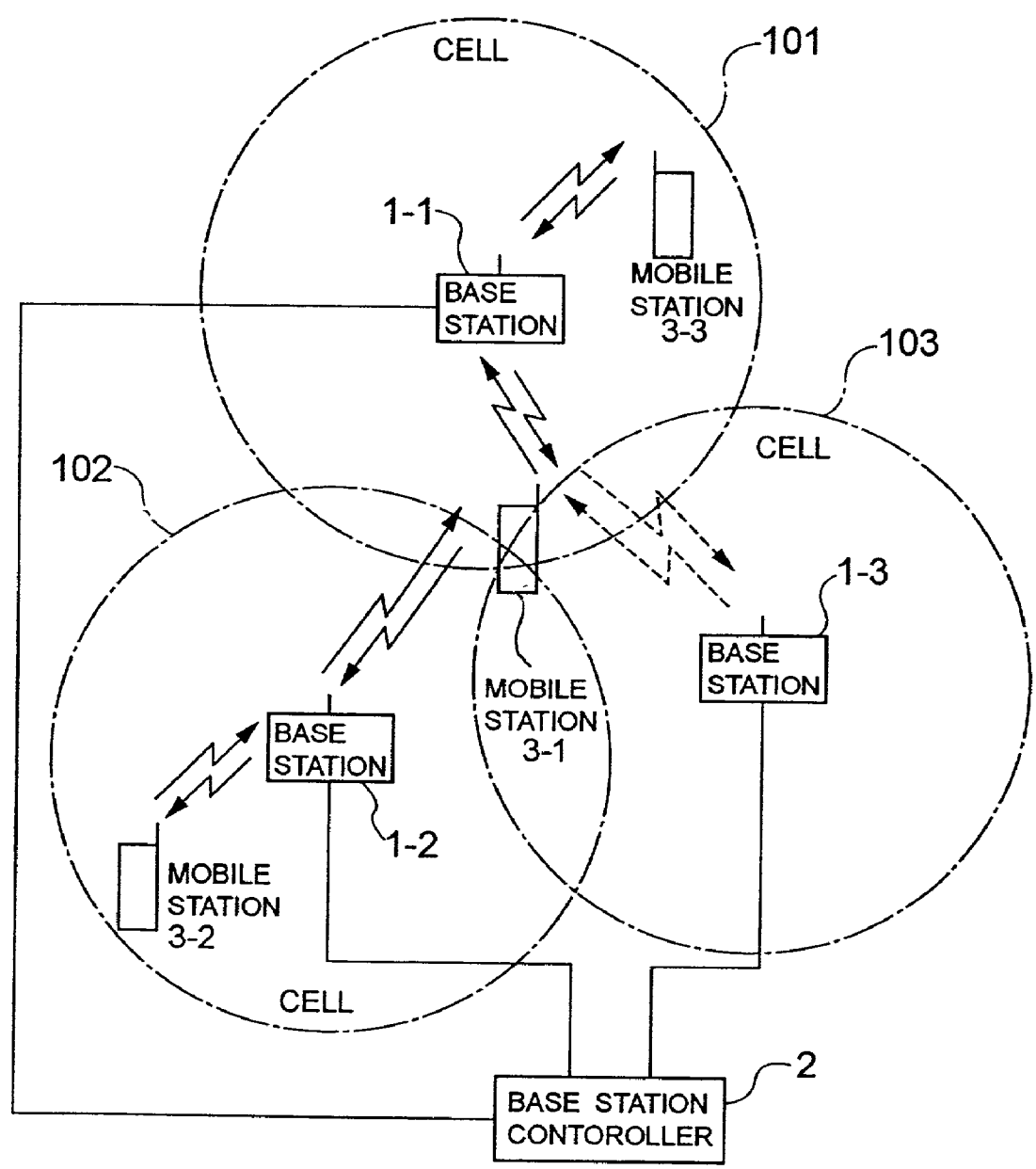
FIG. 18 is a block diagram showing a configuration of a mobile communication system in fourth embodiment of the present invention.

FIG. 18 is a block diagram showing the configuration of a mobile communication system in a fourth embodiment of the present invention. Referring to FIG. 18, the configuration of the mobile communication system in the fourth embodiment of the present invention is the same as that of the mobile communication system in the mode of implementation of the present invention shown in FIG. 1 except that a base station 1-3 and a cell 103 about the base station 1-3 are added.

That is, FIG. 18 shows a configuration in a case where the mobile station 3-1 exchanges individual-communication signals with the three base stations 1-1 to 1-3. In this case, the base station controller 2 determines identification codes for the base stations 1-1 to 1-3 and also determines identification codes for combinations of the base stations. The base station controller 2 notifies the base stations 1-1 to 1-3 of the determination results and also notifies the mobile station 3-1 of the determination results.

FIG. 19 is a diagram showing an example of identification code determined by the base station controller 2 shown in FIG. 18. Referring to FIG. 19, the base station controller 2 sets "010101" as an identification code for the base station 1-1 (BS#1), "010110" as an identification code for the base station 1-2 (BS#2), "010111" as an identification code for the base station 1-3 (BS#3), "101101" as an identification code for the combination of the base stations 1-1 and 1-2 (BS#1&BS#2), and "111101" as an identification code for the combination of the base stations 1-2 and 1-3 (BS#2&BS#3).

The mobile station 3-1 holds the identification code shown above, and the reception quality measurement portion 51 measures the quality of reception of the common pilot signal from each of the base stations 1-1 to 1-3 operating for soft handover. If the difference between the measured qualities of reception is larger than a threshold value set in advance, the mobile station 3-1 transmits, to each of the base stations 1-2 and 1-3 other than the base station 1-1 which will transmit HS-PDSCH data block to this mobile station, a data block reception acknowledgement to which a code word representing the identification code "111101" for the combinations of the base stations 1-2 and 1-3 is added. If only one of the base station, e.g., the base station 1-3 has a reception quality difference from the others larger than the threshold value, the mobile station 3-1 transmits to the base station 1-3 a data block reception acknowledgment to which a code word representing the identification code "010111" representing the base station 1-3 is added.

Thus, the power for transmission of HS-PDSCH data blocks from the base stations 1-2 and 1-3 which cause interference with the mobile station 3-1 can be controlled. By this control, the throughput at the mobile station 3-1 can be improved when soft handover is performed between the three base stations 1-1 to 1-3. While this embodiment has been described with respect to the case where soft handover is performed between the three base stations 1-1 to 1-3, the present invention is also applicable to a system in which soft handover is performed between four or more base stations.

Figure 20:
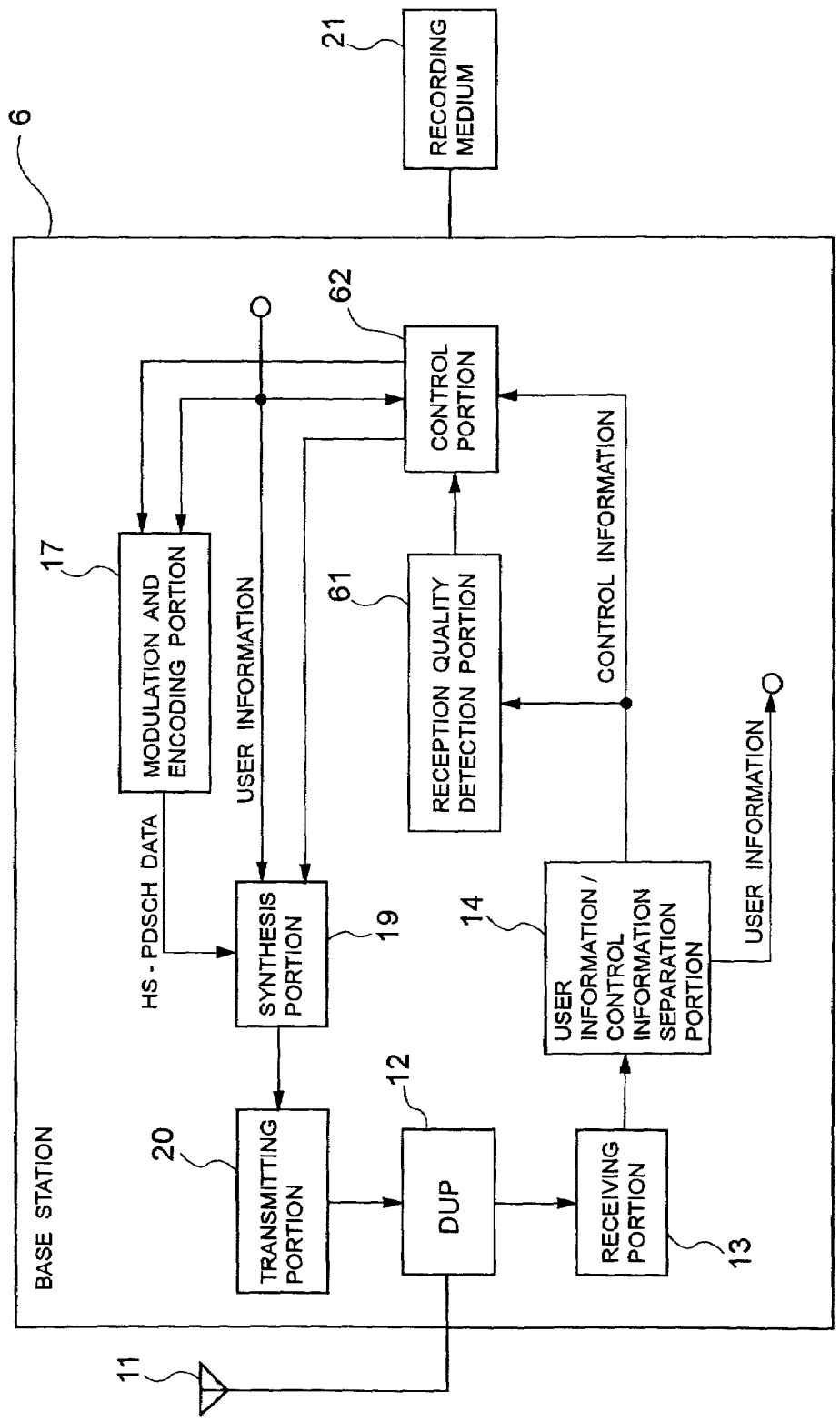
FIG. 20 is a block diagram showing a configuration of a base station in a fifth embodiment of the present invention.

FIG. 20 is a block diagram showing the configuration of a base station in a fifth embodiment of the present invention. Referring to FIG. 20, a base station 6 in the fifth embodiment of the present invention has the same configuration as the base station 1 in the first embodiment of the present invention shown in FIG. 2 except that a reception quality detection portion 61 and a control portion 62 for performing control according to detection results from the reception quality detection portion 61 are provided in place of the transmission timing detection portion 15 and the control portion 16. Components identical or corresponding to those in the first embodiment of the present invention are indicated by the same reference characters. The corresponding components operate in the same manner as those of the first embodiment.

The reception quality detection portion 61 notifies the control portion 62 of the qualities of reception of the common pilot signal received from this base station and other base stations (not shown) operating for soft handover from a mobile station (not shown) to be handed over in soft handover manner. The control portion 62 computes the difference between the reception quality of this base station and those of the other base stations, and controls the power for transmission of HS-PDSCH data to other mobile stations (not shown) if the difference is larger than a threshold value set in advance.

Figure 21:
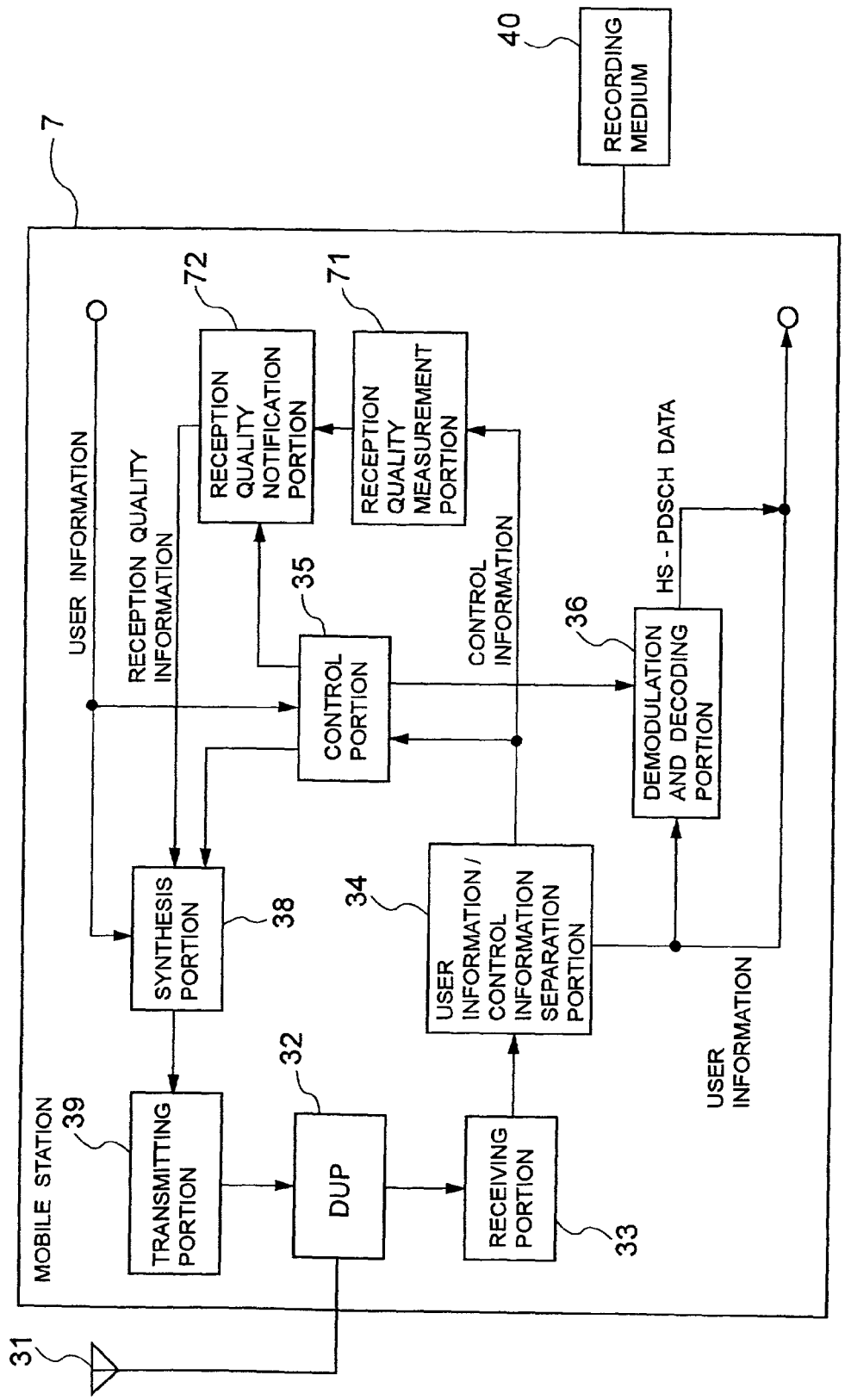
FIG. 21 is a block diagram showing a configuration of a mobile station in the fifth embodiment of the present invention.

FIG. 21 is a block diagram showing the configuration of a mobile station in a fifth embodiment of the present invention. Referring to FIG. 21, a mobile station 7 in the fifth embodiment of the present invention has the same configuration as the mobile station 3 in the first embodiment of the present invention shown in FIG. 3 except that a reception quality measurement portion 71 and a reception quality notification portion 72 are provided in place of the transmission timing detection and notification portion 37. Components identical or corresponding to those in the mobile station 3 are indicated by the same reference characters. The corresponding components operate in the same manner as those of the first embodiment.

The reception quality measurement portion 71 measures the quality of reception of the common pilot signal separated by the user information/control information separation portion 34 and notifies the reception quality notification portion 72 of the measurement result. The reception quality notification portion 72 supplies the synthesis portion 38 with the quality of reception of the common pilot signal from each of base stations (not shown) operating for soft handover to notify the measurement result to the base stations other than the base station which will transmit HS-PDSCH data to the mobile station by using an individual-communication signal over the upstream line.

The mobile communication system (not shown) of the fifth embodiment has the same configuration as that of the system shown in FIG. 1, and the base station 6 shown in FIG. 20 has the same configuration and operates in the same manner as the base stations 1-1 and 1-2 shown in FIG. 1. Also, the mobile station 7 shown in FIG. 21 has the same configuration and operates in the same manner as the mobile stations 3-1 to 3-4 shown in FIG. 1.

Figure 22:
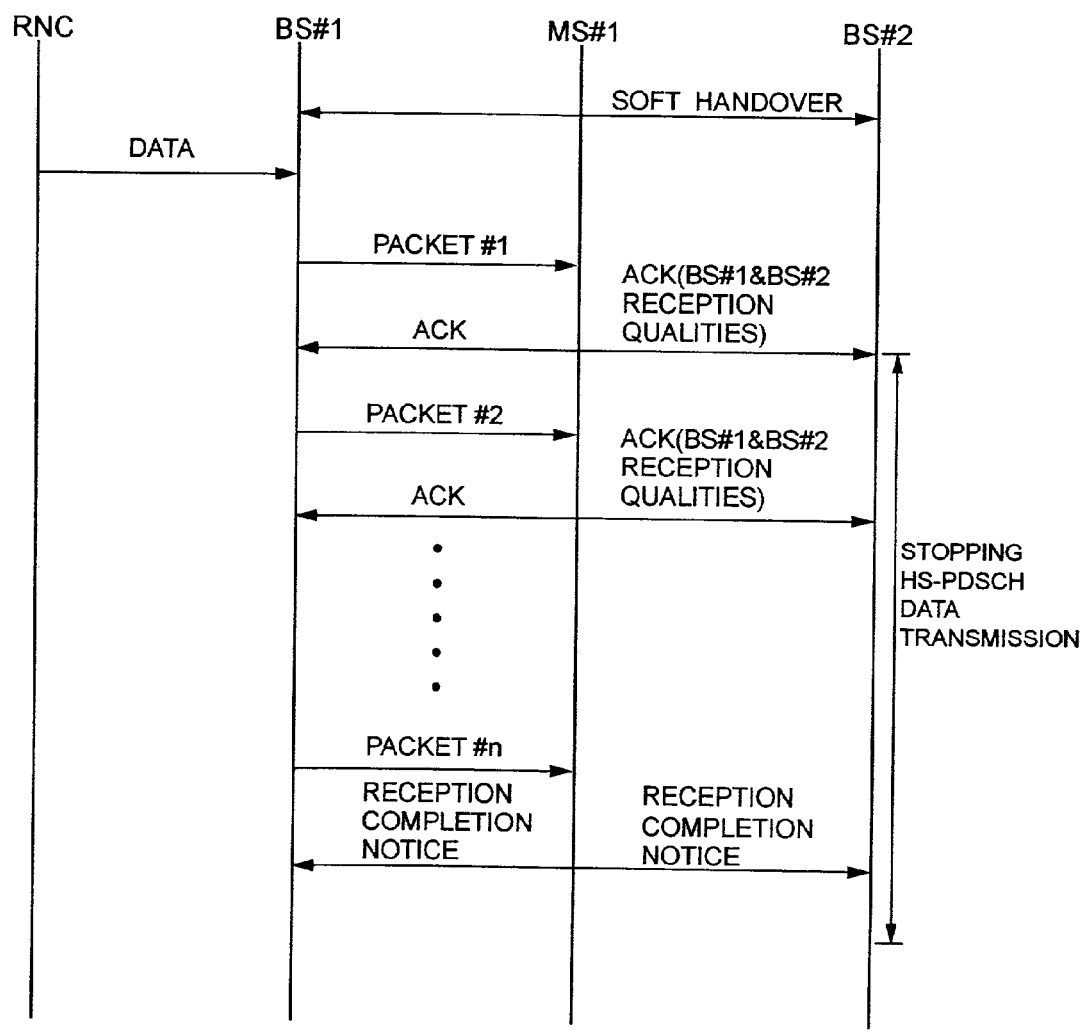
FIG. 22 is a sequence chart showing processing for controlling HS-PDSCH data transmission timing in accordance with the fifth embodiment of the present invention.
Figure 23:
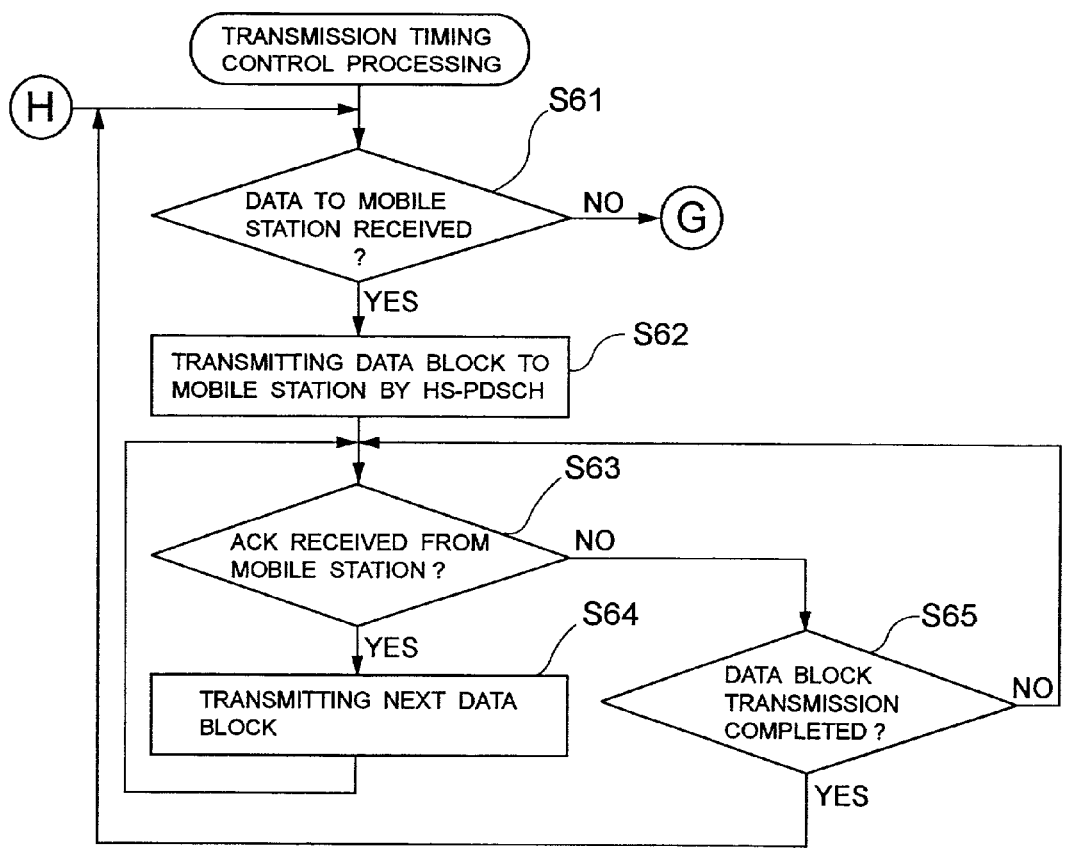
FIG. 23 is a flowchart showing processing for controlling HS-PDSCH data transmission timing in the base station shown in FIG. 1 in accordance with the fifth embodiment of the present invention.
Figure 24:
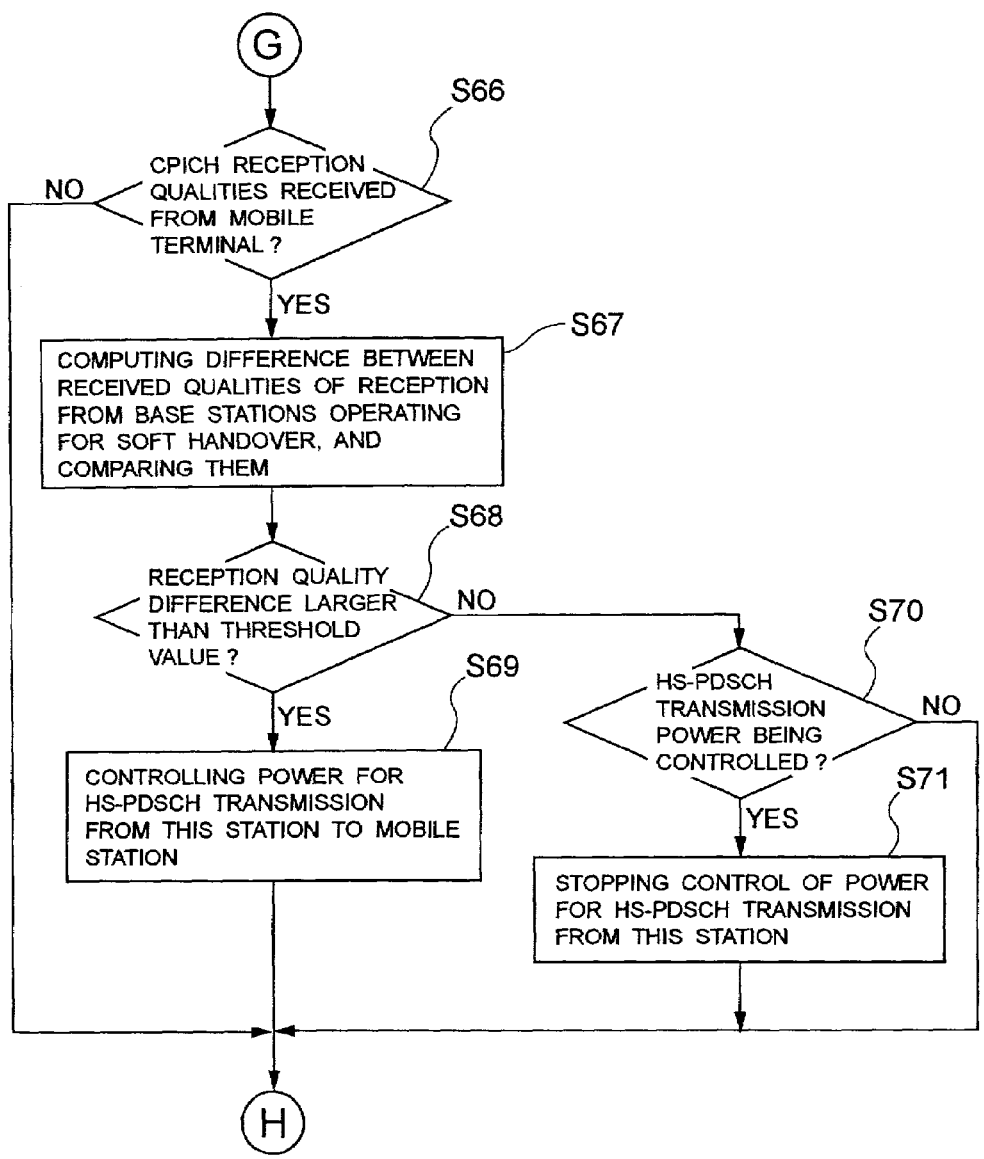
FIG. 24 is a flowchart showing processing for controlling HS-PDSCH data transmission timing in the base station shown in FIG. 1 in accordance with the fifth embodiment of the present invention.
Figure 25:
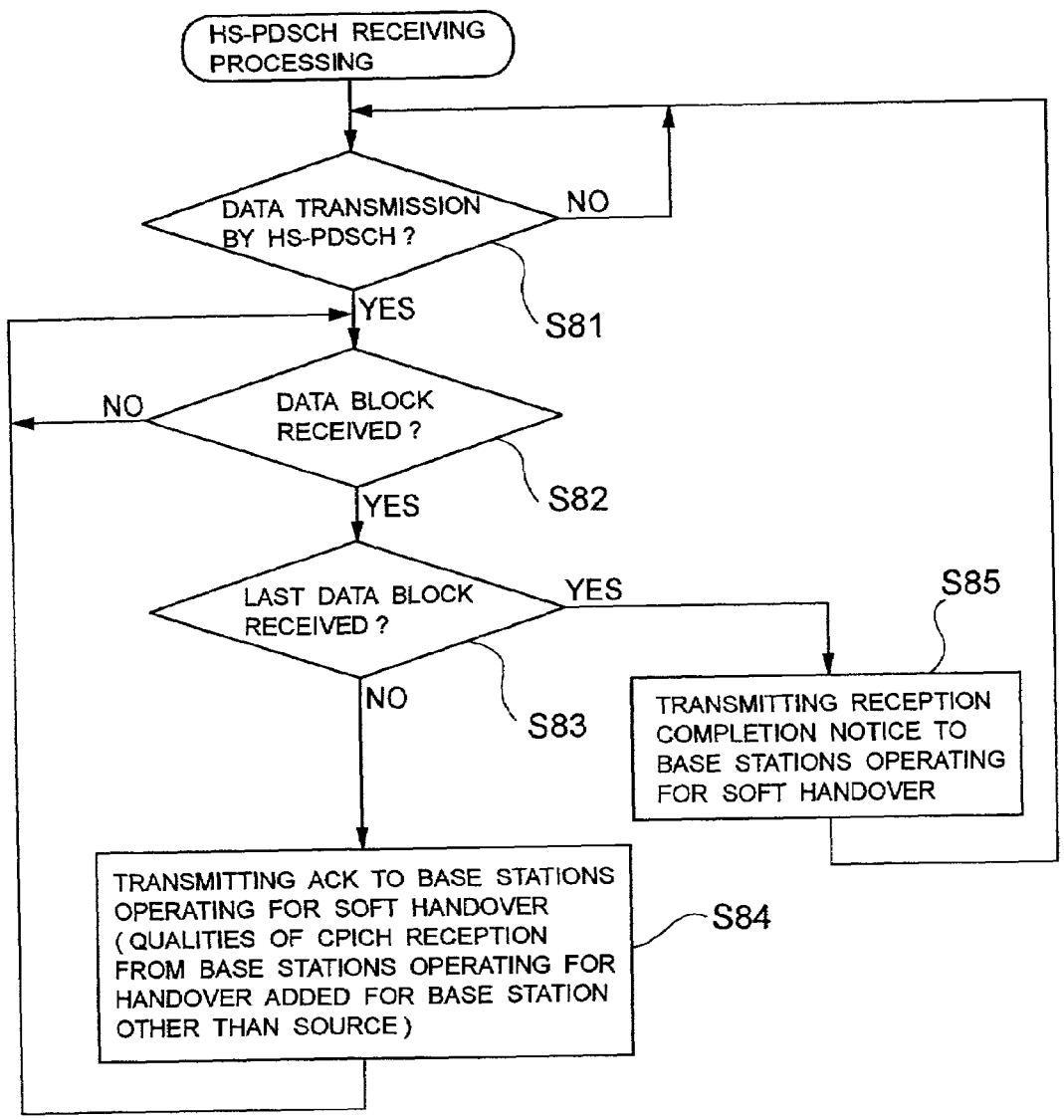
FIG. 25 is a flowchart showing HS-PDSCH data receiving processing in the mobile station shown in FIG. 1 in accordance with the fifth embodiment of the present invention.

FIG. 22 is a sequence chart showing processing for controlling HS-PDSCH data transmission timing in accordance with the fifth embodiment of the present invention. FIGS. 23 and 24 are flowcharts showing processing for controlling HS-PDSCH data transmission timing in the base stations 1-1 and 1-2 shown in FIG. 1 in accordance with the fifth embodiment of the present invention. FIG. 25 is a flowchart showing HS-PDSCH data receiving processing in the mobile station 3-1 shown in FIG. 1 in accordance with the fifth embodiment of the present invention. Transmitting and receiving of HS-PDSCH data in accordance with the fifth embodiment of the present invention will be described with reference to FIGS. 1 and 20 to 25. In FIG. 22, RNC represents the base station controller 2, BS#1 and BS#2 respectively represent the base stations 1-1 and 1-2, and MS#1 represents the mobile station 3-1. It is assumed that the mobile station 3-1 is being handed over in a soft handover manner between the base stations 1-1 and 1-2.

When data to be transmitted to the mobile station 3-1 is supplied from the base station controller 2 to the base station 1-1 (step S61 in FIG. 23), the base station 1-1 starts transmitting HS-PDSCH data blocks to the mobile station 3-1 (step S62 in FIG. 23).

When the mobile station 3-1 receives one HS-PDSCH data block (packet #1, #2, . . . ) from the base station 1-1 (steps S81 and S82 in FIG. 25), it operates as described below if the received datablock is not the last one (step S83 in FIG. 25). The reception quality measurement portion 71 measures the quality of reception of the common pilot signal from each of the base stations 1-1 and 1-2 operating for soft handover, and the mobile station 3-1 transmits a data block reception acknowledgement (ACK) to the base station 1-1 transmitting the HS-PDSCH data block and transmits a data block reception acknowledgement with additional information on the reception qualities notified from the reception quality notification portion 72 to the base station 1-2 transmitting no HS-PDSCH data block to the mobile station 3-1 (step S84 in FIG. 25).

Each time the base station 1-1 receives the data block reception acknowledgement from the mobile station 3-1 (step S63 in FIG. 23), it successively transmits the next data block to the mobile station 3-1 (step S64 in FIG. 23).

On the other hand, in the base station 1-2, if the data block reception acknowledgement received from the mobile station 3-1 by the base station 1-2 has information on the reception qualities added thereto (step S66 in FIG. 24), the difference between the reception qualities of the base stations 1-1 and 1-2 in the received information is computed and compared (step S67 in FIG. 24). If the difference between the reception qualities of the base stations 1-1 and 1-2 is larger than a predetermined threshold value set in advance (step S68 in FIG. 24), the base station 1-2 controls the power for transmission of HS-PDSCH data blocks from itself to another mobile station 3-2 or 3-4 (step S69 in FIG. 24). As long as the difference between the reception qualities of the base stations 1-1 and 1-2 from the mobile station 3-1 is larger than the predetermined threshold value, the base station 1-2 controls the power for transmission of HS-PDSCH data blocks from itself to the other mobile station 3-2 or 3-4.

When the mobile station 3-1 receives the last data block (packet #n) from the base station 1-1 (step S83 in FIG. 25), it transmits a data block reception completion notice to the base stations 1-1 and 1-2 operating for soft handover (step S85 in FIG. 25).

When the base station 1-1 receives the data block reception completion notice from the mobile station 3-1 (step S65 in FIG. 23), the process returns to step S61 and the base station 1-1 waits for the next data from the base station controller 2. If the difference between the reception qualities of the base stations 1-1 and 1-2 from the mobile station 3-1 is smaller than the predetermined threshold value (step S68 in FIG. 24), and if the base station 1-2 is controlling the power for transmission of HS-PDSCH data blocks (step S70 in FIG. 24), the base station 1-2 stops controlling the power for transmission of HS-PDSCH data blocks from itself to the other mobile station 3-2 or 3-4 (step S71 in FIG. 24). Then the process returns to step S61 and the next data from the base station controller 2 or information on the reception qualities from the mobile stations 3-1, 3-2, or 3-4 is awaited.

In this embodiment, the mobile station 3-1 measures the quality of reception of the common pilot signal from each of the base stations 1-1 and 1-2, and the base station 1-2 directly controls the power for transmission of HS-PDSCH data from the base station 1-2 to the other mobile station 3-2 or 3-4 if the interference from the base station 1-2 is higher than a certain level, thereby maximizing the throughput of the entire system. The other effects of this embodiment are the same as those of the first and second embodiments.

Figure 26:
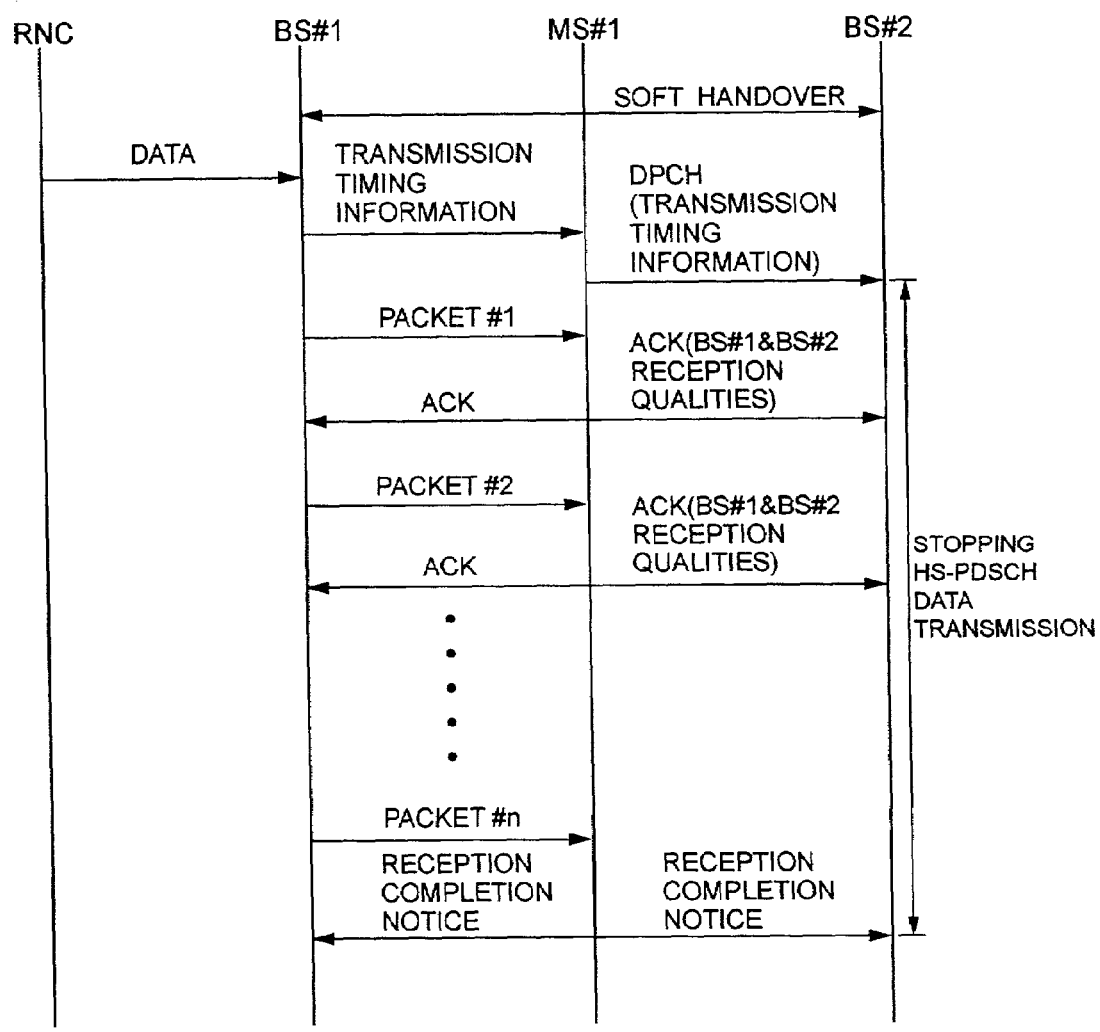
FIG. 26 is a sequence chart showing processing for controlling HS-PDSCH data transmission timing in accordance with a sixth embodiment of the present invention.
Figure 27:
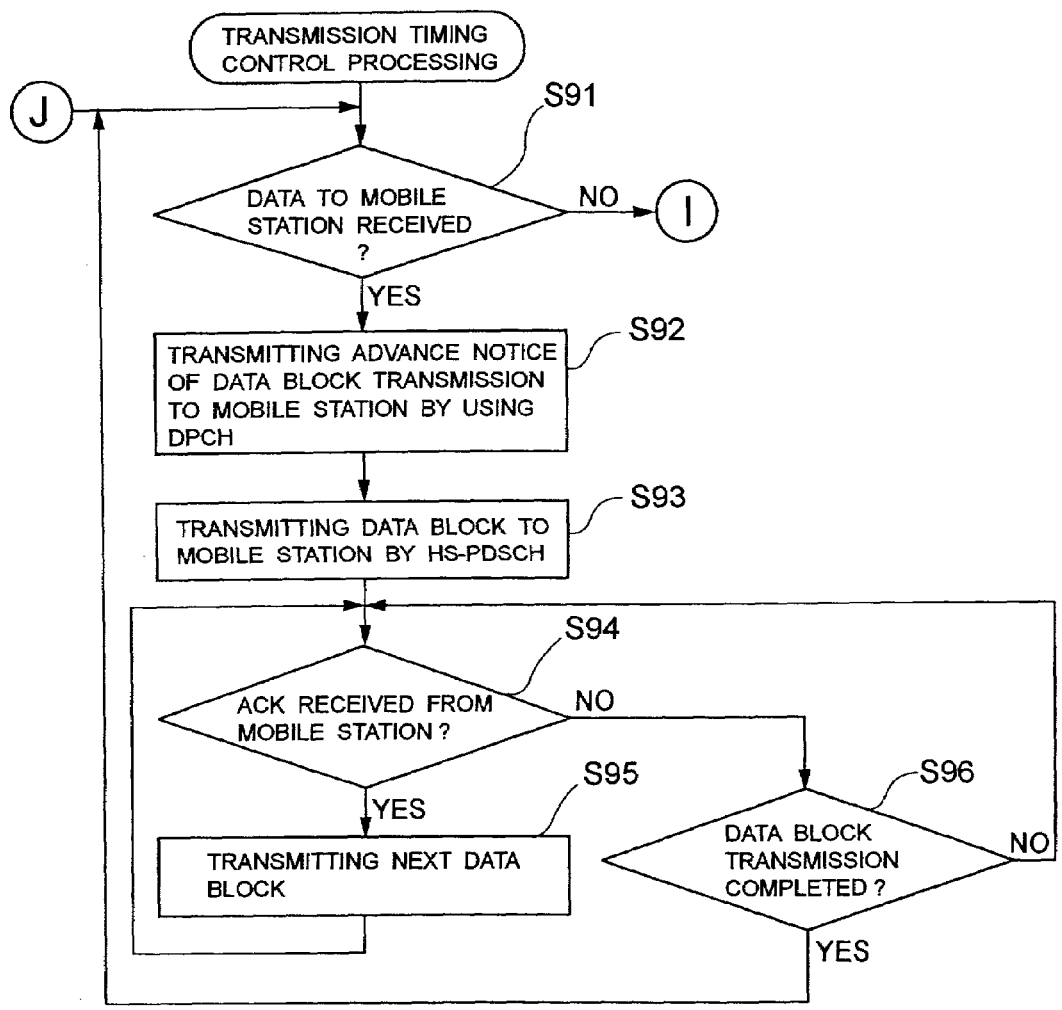
FIG. 27 is a flowchart showing processing for controlling HS-PDSCH data transmission timing in the base station shown in FIG. 1 in accordance with the sixth embodiment of the present invention.
Figure 28:
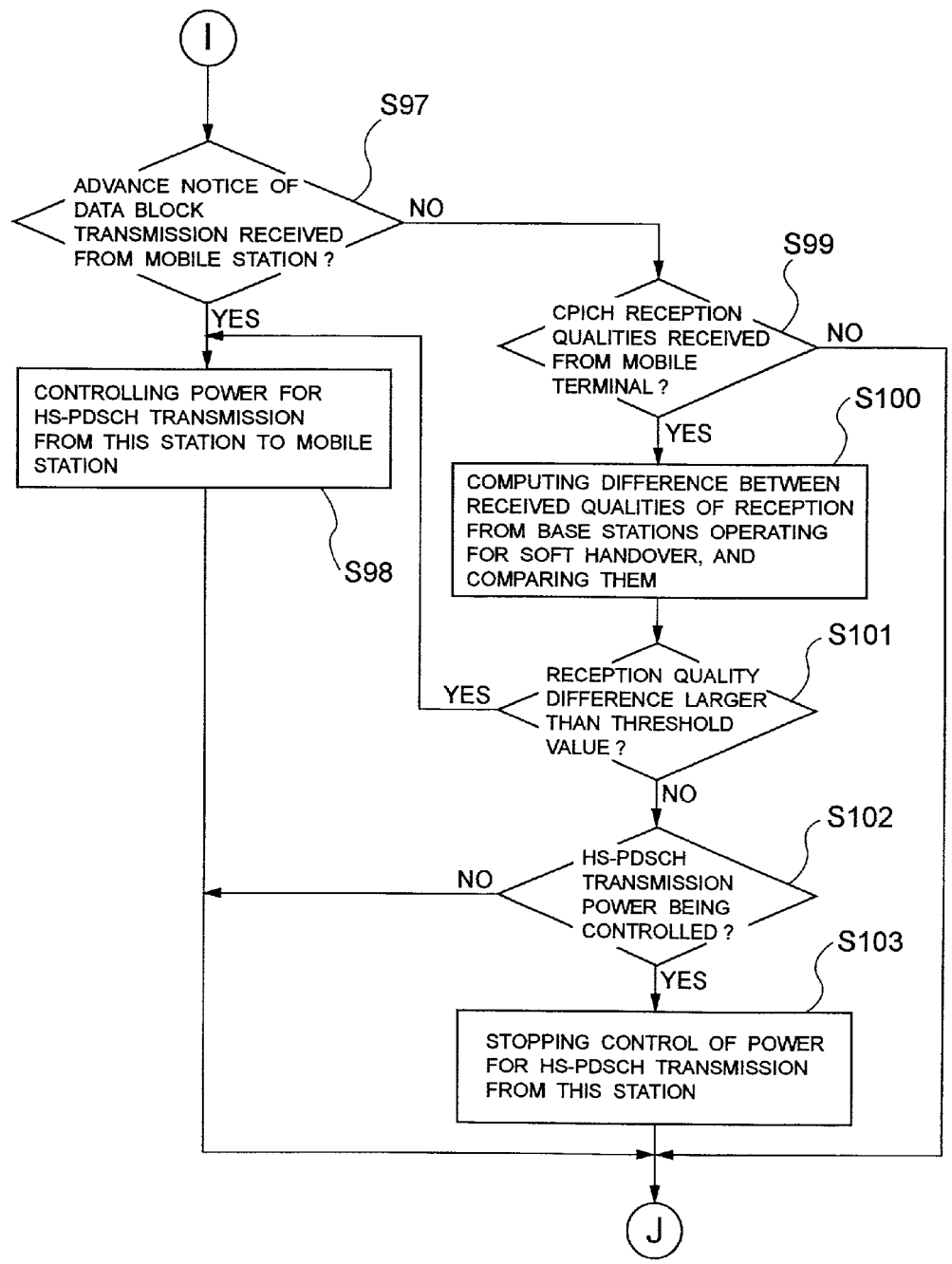
FIG. 28 is a flowchart showing processing for controlling HS-PDSCH data transmission timing in the base station shown in FIG. 1 in accordance with the sixth embodiment of the present invention.
Figure 29:
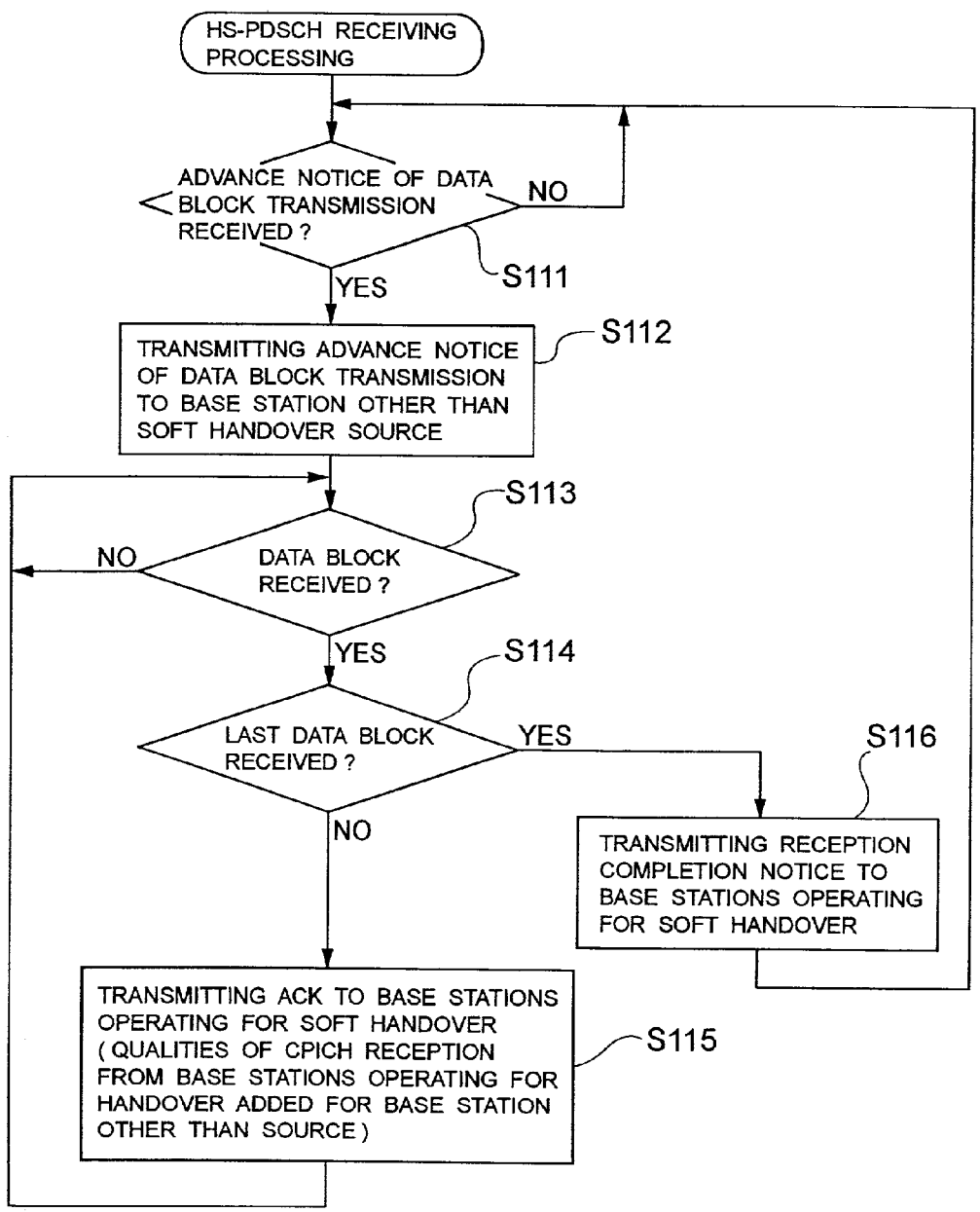
FIG. 29 is a flowchart showing HS-PDSCH data receiving processing in the mobile station shown in FIG. 1 in accordance with the sixth embodiment of the present invention.

FIG. 26 is a sequence chart showing processing for controlling HS-PDSCH data transmission timing in accordance with the sixth embodiment of the present invention. FIGS. 27 and 28 are flowcharts showing processing for controlling HS-PDSCH data transmission timing in the base stations 1-1 and 1-2 shown in FIG. 1 in accordance with the sixth embodiment of the present invention. FIG. 29 is a flowchart showing HS-PDSCH data receiving processing in the mobile station 3-1 shown in FIG. 1 in accordance with the sixth embodiment of the present invention. Transmitting and receiving of HS-PDSCH data in accordance with the sixth embodiment of the present invention will be described with reference to FIGS. 1 and 26 to 29. In FIG. 26, RNC represents the base station controller 2, BS#1 and BS#2 respectively represent the base stations 1-1 and 1-2, and MS#1 represents the mobile station 3-1. It is assumed that the mobile station 3-1 is being handed over in a soft handover manner between the base stations 1-1 and 1-2.

When data to be transmitted to the mobile station 3-1 is supplied from the base station controller 2 to the base station 1-1 (step S91 in FIG. 27), the base station 1-1 transmits an advance notice of transmission of HS-PDSCH data blocks to the mobile station 3-1 by using an individual-communication signal over a downstream line (step S92 in FIG. 27). Thereafter the base station 1-1 starts transmitting HS-PDSCH data blocks to the mobile station 3-1 (step S93 in FIG. 27).

When the mobile station 3-1 receives the advance notice of transmission of HS-PDSCH data blocks from the base station 1-1 (step S111 in FIG. 29), it transmits the data block transmission advance notice as transmission timing information to the base station 1-2 (step S112 in FIG. 29).

When the mobile station 3-1 receives one HS-PDSCH data block (packet #1, #2, . . . ) from the base station 1-1 (step S113 in FIG. 29), it operates as described below if the received data block is not the last one (step S114 in FIG. 29). The reception quality measurement portion 71 measures the quality of reception of the common pilot signal from each of the base stations 1-1 and 1-2 operating for soft handover, and the mobile station 3-1 transmits a data block reception acknowledgement (ACK) to the base station 1-1 transmitting the HS-PDSCH data block and transmits a data block reception acknowledgement with additional information on the reception qualities notified from the reception quality notification portion 72 to the base station 1-2 transmitting no HS-PDSCH data blocks to the mobile station 3-1 (step S115 in FIG. 29).

Each time the base station 1-1 receives the data block reception acknowledgement from the mobile station 3-1 (step S94 in FIG. 27), it successively transmits the next data block to the mobile station 3-1 (step S95 in FIG. 27).

On the other hand, when the base station 1-2 receives the transmission timing information from the mobile station 3-1 (step S97 in FIG. 28), it controls the power for transmission of HS-PDSCH data blocks from itself to another base station 3-2 or 3-4 on the basis of the timing of transmission of data blocks from the base station 1-1 to the mobile station 3-1 (step S98 in FIG. 28).

In this case, if the data block reception acknowledgement received from the mobile station 3-1 by the base station 1-2 has information on the reception qualities added thereto (step S99 in FIG. 28), the difference between the reception qualities of the base stations 1-1 and 1-2 in the received information is computed and compared (step S100 in FIG. 28). If the difference between the reception qualities of the base stations 1-1 and 1-2 is larger than a predetermined threshold value set in advance (step S101 in FIG. 28), the base station 1-2 controls the power for transmission of HS-PDSCH data blocks from itself to the other mobile station 3-2 or 3-4 (step S98 in FIG. 28). As long as the difference between the reception qualities of the base stations 1-1 and 1-2 from the mobile station 3-1 is larger than the predetermined threshold value, the base station 1-2 controls the power for transmission of HS-PDSCH data blocks from itself to the other mobile station 3-2 or 3-4.

When the mobile station 3-1 receives the last data block (packet #n) from the base station 1-1 (step S114 in FIG. 29), it transmits a data block reception completion notice to the base stations 1-1 and 1-2 operating for soft handover (step S116 in FIG. 29).

When the base station 1-1 receives the data block reception completion notice from the mobile station 3-1 (step S96 in FIG. 27), the process returns to step S91 and the base station 1-1 waits for the next data from the base station controller 2. If the difference between the reception qualities of the base stations 1-1 and 1-2 from the mobile station 3-1 is smaller than the predetermined threshold value (step S101 in FIG. 28), and if the base station 1-2 is controlling the power for transmission of HS-PDSCH data blocks (step S102 in FIG. 28), the base station 1-2 stops controlling the power for transmission of HS-PDSCH data blocks from itself to the other mobile station 3-2 or 3-4 (step S103 in FIG. 28). Then the process returns to step S91 and the next data from the base station controller 2 or information on the reception qualities from the mobile stations 3-1, 3-2, or 3-4 is awaited.

In this embodiment, the base station 1-2 controls the power for transmission of HS-PDSCH data blocks on the basis of transmission timing information from the mobile station 3-1 instead of starting controlling the power for transmission of HS-PDSCH data blocks after the arrival of the reception quality measurement results from the mobile station 3-1 as in the fifth embodiment of the present invention. Therefore, even in a case where the interference from the base station 1-2 is large from the outset, a throughput improvement effect can be immediately obtained. The other effects of this embodiment are the same as those of the fifth embodiment.

In the fifth and sixth embodiments of the present invention, information on the very qualities of reception of the common pilot signal from the base stations 1-1 and 1-2 operating for soft handover, measured by the reception quality measurement portion 71, is transmitted by being added to the data block reception acknowledgment. Alternatively, the difference between the qualities of reception of the common pilot signal may be computed by the reception quality notification portion 72 and the computed value may be transmitted by being added to the data block reception acknowledgment.

According to the present invention, as described above, in a mobile communication system in which individual-communication signals are transmitted and received between first and second base stations and a mobile station located in the vicinity of a cell boundary between the first and second base stations to achieve soft handover, and in which data transmission from each of the first and second base stations to the mobile station is performed by the HS-PDSCH method, HS-PDSCH data transmission from one of the first and second base stations is controlled when HS-PDSCH data transmission from the other of the first and second base stations is performed, thus avoiding deterioration in the quality of the line to the mobile station in the vicinity of the cell boundary and enabling high-speed transmission to the mobile station.

What is claimed is:

1. A mobile communication system comprising:
at least first and second base stations;
a first mobile station located in the vicinity of a cell boundary between the at least first and second base stations, wherein individual-communication signals are transmitted and received between at least said at least first and second base stations and said first mobile station;
control means for controlling down link data transmission performed in one of the at least first and second base stations when down link data transmission is performed in the other of the at least first and second base stations; and
timing notification means for sending to said one of the at least first and second base stations timing information indicating timing of down link data transmission in the other of the at least first and second base stations, said timing notification means being provided in the first mobile station.

2. The mobile communication system according to claim 1, wherein said timing notification means notifies said one of the at least first and second base stations of a numeric value indicating the timing of down link data transmission, the numeric value being provided as said timing information.

3. The mobile communication system according to claim 1, wherein said timing notification means sends, as said timing information to said one of said at least first and second base stations, a signal for notification that a start of said down link data transmission is timed after a predetermined time set in advance.

4. The mobile communication system according to claim 1, further comprising notification means for notifying the first mobile station of timing of down link data transmission, said notification means being provided in each of the at least first and second base stations.

5. The mobile communication system according to claim 1, wherein said control means controls the power for down link data transmission from said one of the at least first and second base stations to a second mobile station by the same timing as the timing notified from the first mobile station.

6. The mobile communication system according to claim 5, wherein said control means stops down link data transmission to the second mobile station.

7. The mobile communication system according to claim 5, wherein said control means reduces the power for down link data transmission to the second mobile station.

8. The mobile communication system according to claim 5, wherein said control means controls the power for down link data transmission to the second mobile station before the completion of down link data transmission is detected on the basis of a notification signal from the first mobile station.

9. The mobile communication system according to claim 1, wherein said downlink data transmission is HSDPA data transmission.

10. A mobile communication system comprising:
at least first and second base stations;
a first mobile station located in the vicinity of a cell boundary between said at least first and second base stations, wherein individual-communication signals are transmitted and received between said at least first and second base stations and said first mobile station;

control means for controlling down link data transmission performed in one of the at least first and second base stations when down link data transmission is performed in the other of the at least first and second base stations;

measurement means for measuring the quality of reception of a common pilot signal from each of the at least first and second base stations; and notification means for sending to said one of the at least first and second base stations information based on the results of measurement by said measurement means, said measurement means and said notification means being provided in the first mobile station, wherein said notification means notifies said one of the at least first and second base stations of the quality of reception of the common pilot signal from the at least first and second base stations measured by said measurement means, and wherein said control means controls the power for down link data transmission on the basis of the information from said notification means.

11. The mobile communication system according to claim 10, wherein said control means controls the power for down link data transmission to a second mobile station when the difference between the quality of reception of the common pilot signal from the at least first and second base stations is larger than a threshold value.

12. The mobile communication system according to claim 10, wherein said downlink data transmission is HSDPA data transmission.

13. A mobile communication system comprising:
at least first and second base stations;
a first mobile station located in the vicinity of a cell boundary between the at least first and second base stations, wherein individual-communication signals are transmitted and received between said at least first and second base stations and said first mobile station;

control means for controlling down link data transmission performed in one of the at least first and second base stations when down link data transmission is performed in the other of the at least first and second base stations;

measurement means for measuring the quality of reception of a common pilot signal from each of the at least first and second base stations; and notification means for sending to said one of the at least first and second base stations information based on results of measurement by said measurement means, said measurement means and said notification means being provided in the first mobile station, wherein said notification means computes a difference between the quality of reception of the common pilot signal from the at least first and second base stations measured by said measurement means, and notifies said one of the at least first and second base stations of the computed difference, and wherein said control means controls the power for down link data transmission on the basis of the information from said notification means.

14. The mobile communication system according to claim 13, wherein said downlink data transmission is HSDPA data transmission.

15. A mobile communication system comprising:
at least first and second base stations;
a first mobile station located in the vicinity of a cell boundary between the at least first and second base stations, wherein individual-communication signals are transmitted and received between at least said at least first and second base stations and said first mobile station;

control means for controlling down link data transmission performed in one of the at least first and second base stations when down link data transmission is performed in the other of the at least first and second base stations;

measurement means for measuring the quality of reception of a common pilot signal from each of the at least first and second base stations; and notification means for sending to said one of the at least first and second base stations information based on results of measurement by said measurement means, said measurement means and said notification means being provided in the first mobile station, wherein said notification means sends a signal for urging said one of the at least first and second base stations to control the power for down link data transmission when it is determined from the results of measurement by said measurement means that interference with the first mobile station is large, and wherein said control means controls the power for down link data transmission on the basis of the information from said notification means.

16. The mobile communication system according to claim 15, wherein said notification means sends identification information for identification of said one of the at least first and second base stations when the difference between the quality of reception of the common pilot signal from the at least first and second base stations is larger than a threshold value.

17. The mobile communication system according to claim 16, wherein said control means controls the power for down link data transmission to a second mobile station when receiving the identification information.

18. The mobile communication system according to claim 16, wherein the identification information comprises information for identification of a plurality of the base stations.

19. The mobile communication system according to claim 15, wherein said downlink data transmission is HSDPA data transmission.

20. A base station which exchanges individual-communication signals with a first mobile station located in the vicinity of a cell boundary, wherein the base station transmits data to the first mobile station, the base station comprising:

control means for controlling down link data transmission in itself when down link data transmission is performed in another base station; and timing receiving means for receiving information from the first mobile station indicating timing of down link data transmission in the other base station, wherein said control means controls power for down link data transmission on the basis of the received information.

21. The base station according to claim 20, wherein said control means controls the power for down link data transmission on the basis of a numeric value which is received as said timing information, and which indicates timing of said down link data transmission.

22. The base station according to claim 20, wherein said control means controls the power for said down link data transmission on the basis of a signal which is received as said timing information, and which is provided for notification that a start of down link data transmission is timed after a predetermined time set in advance.

23. The base station according to claim 20, further comprising notification means for notifying the first mobile station of timing of down link data transmission.

24. The base station according to claim 20, wherein said control means controls the power for said down link data transmission from the base station to which said control means belongs on the basis of the same timing as the timing notified from the first mobile station.

25. The base station according to claim 24, wherein said control means stops down link data transmission in the base station to which said control means belongs.

26. The base station according to claim 24, wherein said control means reduces the power for down link data transmission in the base station to which said control means belongs.

27. The base station according to claim 24, wherein said control means controls the power for down link data transmission to a second mobile station before the completion of down link data transmission is detected on the basis of a notification signal from the first mobile station.

28. The base station according to claim 20, wherein said downlink data transmission is HSDPA data transmission.

29. A base station which exchanges individual-communication signals with a first mobile station located in the vicinity of a cell boundary, wherein the base station transmits data to the first mobile station, the base station comprising:
    control means for controlling down link data transmission in itself when down link data transmission is performed in another base station; and
    notification means which notifies said control means when information based on the results of measurement of quality of reception of a common pilot signal from the base station to which said control means belongs and from the other base station is sent from the first mobile station,
    wherein said control means controls power for down link data transmission on the basis of the information, and
    wherein when said notification means notifies said control means of the quality of said common pilot signal reception from the first mobile station, said control means controls the power for down link data transmission according to the reception quality.

30. The base station according to claim 29, wherein said control means controls the power for down link data transmission when the difference between the quality of reception of the common pilot signal is larger than a threshold value.

31. The base station according to claim 29, wherein said downlink data transmission is HSDPA data transmission.

32. A base station which exchanges individual-communication signals with a first mobile station located in the vicinity of a cell boundary, wherein the base station transmits data to the first mobile station, the base station comprising:
    control means for controlling down link data transmission in itself when down link data transmission is performed in another base station; and
    notification means which notifies said control means when information based on the results of measurement of quality of reception of a common pilot signal from the base station to which said control means belongs and from the other base station is sent from the first mobile station,
    wherein said control means controls power for down link data transmission on the basis of the information, and
    wherein when said notification means notifies said control means of a difference between the common pilot signal reception quality from the first mobile station, said control means controls the power for down link data transmission according to the difference between the reception qualities.

33. The base station according to claim 32, wherein said downlink data transmission is HSDPA data transmission.

34. A base station which exchanges individual-communication signals with a first mobile station located in the vicinity of a cell boundary, wherein the base station transmits data to the first mobile station, the base station comprising:
    control means for controlling down link data transmission in itself when down link data transmission is performed in another base station; and
    notification means which notifies said control means when information based on the results of measurement of quality of reception of a common pilot signal from the base station to which said control means belongs and from the other base station is sent from the first mobile station,
    wherein said control means controls power for down link data transmission on the basis of the information, and
    wherein said control means controls the power for down link data transmission according to a signal which is notified by said notification means when in the first mobile station it is determined from a results of measurement of the reception quality that interference with the first mobile station is large, and which is provided to urge the base station to control the power for down link data transmission.

35. The base station according to claim 34, wherein said control means controls the power for down link data transmission according to identification information which is supplied when in the first mobile station it is determined that a difference between the common pilot signal reception qualities is larger than a threshold value, and which is provided for identification of the base station to which said control means belongs and the other base station.

36. The base station according to claim 35, wherein said control means controls the power for down link data transmission to a second mobile station when receiving the identification information.

37. The base station according to claim 35, wherein the identification information comprises information for identification of a plurality of the base stations.

38. The base station according to claim 34, wherein said downlink data transmission is HSDPA data transmission.

39. A method of controlling timing of packet transmission in a mobile communication system in which individual-communication signals are transmitted and received between at least first and second base stations and a first mobile station located in the vicinity of a cell boundary between the first and second base stations, and in which data transmission from each of the first and second base stations to the first mobile station is performed, said method comprising:
    controlling down link data transmission in one of the at least first and second base stations when down link data transmission is performed in the other of the at least first and second base stations; and
    sending to said one of the at least first and second base stations timing information indicating timing of down link data transmission in the other of the at least first and second base stations, said sending timing information being performed in the first mobile station.

40. The method according to claim 39, wherein, in said sending said timing information, said one of the at least first and second base stations is notified of a numeric value indicating the timing of said down link data transmission, the numeric value being provided as said timing information.

41. The method according to claim 39, wherein, in said sending said timing information, a signal for notification that a start of down link data transmission is timed after a predetermined time is sent as said timing information to said one of the at least first and second base stations.

42. The method according to claim 39, further comprising notifying the first mobile station of timing of down link data transmission, said notification being performed in each of the at least first and second base stations.

43. The method according to claim 39, wherein, in said controlling down link data transmission, power for down link data transmission from said one of the at least first and second base stations to a second mobile station is controlled by the same timing as the timing notified from the first mobile station.

44. The method according to claim 43, wherein, in said controlling down link data transmission, said down link data transmission to the second mobile station is stopped.

45. The method according to claim 43, wherein, in said controlling down link data transmission, the power for down link data transmission to the second mobile station is reduced.

46. The method according to claim 43, wherein in said controlling down link data transmission, the power for down link data transmission to the second mobile station is controlled before completion of down link data transmission is detected on the basis of a notification signal from the first mobile station.

47. The method according to claim 39, wherein said downlink data transmission is HSDPA data transmission.

48. A method of controlling timing of packet transmission in a mobile communication system in which individual-communication signals are transmitted and received between at least first and second base stations and a first mobile station located in the vicinity of a cell boundary between the at least first and second base stations, and in which data transmission from each of the at least first and second base stations to the first mobile station is performed, said method comprising:
controlling down link data transmission in one of the at least first and second base stations when down link data transmission is performed in the other of the at least first and second base stations;
measuring quality of reception of a common pilot signal from each of the at least first and second base stations; and
sending to said one of the at least first and second base stations information based on the results of measurement performed in said measuring the quality of reception, wherein said one of the at least first and second base stations is notified of the quality of reception of the common pilot signal from the at least first and second base stations measured,
wherein said measuring quality of reception and said sending information based on measurement results are performed in the first mobile station, and
wherein, in said controlling down link data transmission, power for down link data transmission is controlled on the basis of the information from said sending information based on measurement results.

49. The method according to claim 48, wherein said downlink data transmission is HSDPA data transmission.

50. A method of controlling timing of packet transmission in a mobile communication system in which individual-communication signals are transmitted and received between at least first and second base stations and a first mobile station located in the vicinity of a cell boundary between the at least first and second base stations, and in which data transmission from each of the at least first and second base stations to the first mobile station is performed, said method comprising:
controlling down link data transmission in one of the at least first and second base stations when down link data transmission is performed in the other of the at least first and second base stations;
measuring quality of reception of a common pilot signal from each of the at least first and second base stations; and
sending to said one of the at least first and second base stations information based on results of measurement performed in said measuring quality of reception, wherein a difference between the measured quality of reception of the common pilot signal from the at least first and second base stations is computed and said one of the at least first and second base stations is notified of the computed difference,
wherein said measuring quality of reception and said sending information based on measurement results are performed in the first mobile station, and
wherein, in said controlling down link data transmission, power for down link data transmission is controlled on the basis of the information from said sending information based on measurement results.

51. The method according to claim 50, wherein said downlink data transmission is HSDPA data transmission.

52. The method according to claim 48 or 50, wherein, in said controlling down link data transmission, the power for down link data transmission to a second mobile station is controlled when the difference between the quality of reception of the common pilot signal from each of the first and second base stations is larger than a threshold value.

53. A method of controlling timing of packet transmission in a mobile communication system in which individual-communication signals are transmitted and received between at least first and second base stations and a first mobile station located in the vicinity of a cell boundary between the at least first and second base stations, and in which data transmission from each of the at least first and second base stations to the first mobile station is performed, said method comprising:
controlling down link data transmission in one of the at least first and second base stations when down link data transmission is performed in the other of the at least first and second base stations;
measuring quality of reception of a common pilot signal from each of the at least first and second base stations; and
sending to said one of the at least first and second base stations information based on results of measurement performed in said measuring quality of reception, wherein a signal for urging said one of the at least first and second base stations to control power for down link data transmission is sent to said one of the at least first and second base stations when it is determined from the measurement results that interference with the first mobile station is large,
wherein said measuring quality of reception and said sending information based on measurement results are performed in the first mobile station, and wherein, in said controlling down link data transmission, the power for down link data transmission is controlled on the basis of the information from said sending information based on measurement results.

54. The method according to claim 53, wherein, in said sending information based on the measurement results, identification information for identification of said one of the at least first and second base stations is provided when a difference between the quality of reception of the common pilot signal from each of the at least first and second base stations is larger than a threshold value.

55. The method according to claim 54, wherein, in said controlling down link data transmission, the power for down link data transmission to a second mobile station is controlled when the identification information is being received.

56. The method according to claim 54, wherein the identification information comprises information for identification of a plurality of the base stations.

57. The method according to claim 53, wherein said downlink data transmission is HSDPA data transmission.

58. A computer-readable medium on which is recorded a program for carrying out a method of packet transmission in a mobile communication system performed in at least first and second base stations, the program comprising operations for:
  transmitting and receiving individual-communication signals between at least first and second base stations and a first mobile station located in the vicinity of a cell boundary between the at least first and second base stations;
  controlling down link data transmission in one of the at least first and second base stations when down link data transmission is performed in the other of the at least first and second base stations; and
  sending to said one of the at least first and second base stations timing information indicating timing of down link data transmission in the other of the at least first and second base stations, said step of sending timing information being performed in the first mobile station.

59. The computer-readable medium according to claim 58, wherein, in said sending said timing information, said one of the at least first and second base stations is notified of a numeric value indicating the timing of said down link data transmission, the numeric value being provided as said timing information.

60. The computer-readable medium according to claim 58, wherein, in said sending said timing information, a signal for notification that a start of down link data transmission is timed after a predetermined time set in advance is sent as said timing information to said one of the first and second base stations.

61. The computer-readable medium method-according to claim 58, further comprising notifying the first mobile station of timing of down link data transmission, said notification being performed in each of the first and second base stations.

62. The computer-readable medium according to claim 58, wherein, in said controlling down link data transmission, power for down link data transmission from said one of the at least first and second base stations to a second mobile station is controlled by the same timing as the timing notified from the first mobile station.

63. The computer-readable medium according to claim 62, wherein, in said controlling down link data transmission, said down link data transmission to the second mobile station is stopped.

64. The computer-readable medium according to claim 62, wherein, in said controlling down link data transmission, the power for down link data transmission to the second mobile station is reduced.

65. The computer-readable medium according to claim 62, wherein in said controlling down link data transmission, the power for down link data transmission to the second mobile station is controlled before completion of down link data transmission is detected on the basis of a notification signal from the first mobile station.

66. The computer-readable medium according to claim 58, wherein said downlink data transmission is HSDPA data transmission.

* * * * *